United States Patent
Hall et al.

(10) Patent No.: US 11,613,491 B2
(45) Date of Patent: Mar. 28, 2023

(54) METHODS OF CERAMMING GLASS ARTICLES HAVING IMPROVED WARP

(71) Applicant: CORNING INCORPORATED, Corning, NY (US)

(72) Inventors: Jill Marie Hall, Elmira, NY (US); Mathieu Gerard Jacques Hubert, Corning, NY (US); Andrew Peter Kittleson, Honeoye Falls, NY (US); John Robert Saltzer, Jr., Beaver Dams, NY (US)

(73) Assignee: Corning Incorporated, Corning, NY (US)

( * ) Notice: Subject to any disclaimer, the term of this patent is extended or adjusted under 35 U.S.C. 154(b) by 145 days.

(21) Appl. No.: 16/511,443

(22) Filed: Jul. 15, 2019

(65) Prior Publication Data

US 2020/0017393 A1     Jan. 16, 2020

Related U.S. Application Data

(60) Provisional application No. 62/749,815, filed on Oct. 24, 2018, provisional application No. 62/698,563, filed on Jul. 16, 2018.

(51) Int. Cl.
*C03B 32/02*     (2006.01)
*C03B 27/04*     (2006.01)
*C03C 21/00*     (2006.01)

(52) U.S. Cl.
CPC ...... *C03B 27/0404* (2013.01); *C03B 27/0413* (2013.01); *C03C 21/002* (2013.01)

(58) Field of Classification Search
None
See application file for complete search history.

(56) References Cited

U.S. PATENT DOCUMENTS 2,920,971 A    1/1960   Stookey
3,129,087 A    4/1964   Hagy
(Continued)

FOREIGN PATENT DOCUMENTS

CN    1367149 A    9/2002
CN    1575265 A    2/2005
(Continued)

OTHER PUBLICATIONS

Oka JP2014012617A Machine translation Via google patents https://patents.google.com/patent/JP2014012617A/en (Year: 2014).*
(Continued)

*Primary Examiner* — Jodi C Franklin
(74) *Attorney, Agent, or Firm* — Jeffrey A. Schmidt

(57) ABSTRACT

Glass stack configurations including a carrier plate, setter plates, and glass sheets for thermal treatment of the glass sheets to form glass ceramic articles are provided. The glass stacking configurations and components described herein are selected to improve thermal uniformity throughout a glass stack during ceramming processes while maintaining or even reducing the stresses in the resultant glass ceramic article. Accordingly, the glass ceramic articles made according to the various embodiments described herein exhibit improved optical qualities and less warp than glass ceramic articles made according to conventional processes. Various embodiments of carrier plates, setter plates, parting agent compositions, and methods of stacking glass sheets are described.

13 Claims, 25 Drawing Sheets

(56) References Cited

U.S. PATENT DOCUMENTS

| | | | |
|---|---|---|---|
| 3,617,317 A | 11/1971 | Sack et al. | |
| 3,809,543 A | 5/1974 | Gaskell et al. | |
| 3,809,599 A | 5/1974 | Pei | |
| 3,817,732 A | 6/1974 | Pei | |
| 3,931,438 A | 1/1976 | Beall et al. | |
| 3,972,704 A | 8/1976 | Loxley et al. | |
| 4,042,362 A | 8/1977 | MacDowell et al. | |
| 4,191,583 A * | 3/1980 | Armistead | C03B 19/06 501/69 |
| 4,219,344 A * | 8/1980 | Armistead | C03B 19/06 501/9 |
| 4,222,760 A * | 9/1980 | Chyung | C03B 32/02 501/151 |
| 4,248,925 A | 2/1981 | Ambrogi | |
| 4,274,857 A | 6/1981 | Wolfe | |
| 4,340,436 A * | 7/1982 | Dubetsky | C03C 10/00 156/89.18 |
| 4,786,305 A | 11/1988 | Ball et al. | |
| 4,910,638 A * | 3/1990 | Berghout | H01G 4/008 361/321.3 |
| 5,030,433 A * | 7/1991 | Mehrotra | C09C 1/3036 423/335 |
| 5,073,181 A | 12/1991 | Foster et al. | |
| 5,147,436 A * | 9/1992 | Blakeslee | C03B 11/06 65/162 |
| 5,296,294 A * | 3/1994 | Suzuki | C03C 3/087 428/409 |
| 5,389,582 A | 2/1995 | Loxley et al. | |
| 5,588,979 A | 12/1996 | Miyazaki et al. | |
| 5,603,147 A * | 2/1997 | Bischoff | H01G 4/1254 156/89.14 |
| 5,680,685 A * | 10/1997 | Bischoff | H01G 4/30 156/242 |
| 5,814,262 A * | 9/1998 | Ketcham | C04B 35/62218 264/316 |
| 5,836,760 A * | 11/1998 | Turner | F27D 3/123 432/253 |
| 5,840,221 A * | 11/1998 | Lau | C04B 35/62897 264/29.7 |
| 6,055,151 A * | 4/2000 | Tormey | H01C 7/003 29/831 |
| 6,374,640 B1 | 4/2002 | Fotheringham et al. | |
| 6,408,813 B1 | 6/2002 | Wilksch et al. | |
| 6,409,813 B1 | 6/2002 | Beesabathina et al. | |
| 6,410,892 B1 | 6/2002 | Peschl et al. | |
| 6,852,569 B2 * | 2/2005 | Nakano | H01L 21/4857 156/89.11 |
| 7,054,136 B2 | 5/2006 | Ritter | H01G 4/2325 361/309 |
| 7,125,320 B1 * | 10/2006 | Brown | B24B 55/04 451/44 |
| 7,312,154 B2 * | 12/2007 | Cites | B24B 37/013 216/84 |
| 7,410,716 B2 * | 8/2008 | Garner | C04B 35/6264 429/465 |
| 7,618,843 B2 * | 11/2009 | Nakano | H01L 21/4857 156/89.11 |
| 8,854,623 B2 | 10/2014 | Fontaine et al. | |
| 9,126,859 B2 * | 9/2015 | Nakane | C03C 10/0027 |
| 9,156,726 B2 * | 10/2015 | Katayama | C03C 4/18 |
| 9,260,337 B2 * | 2/2016 | Abramov | C03B 33/04 |
| 9,260,342 B2 | 2/2016 | Borczuch-Laczka et al. | |
| 9,382,603 B2 * | 7/2016 | Kimura | C22F 1/14 |
| 9,604,871 B2 | 3/2017 | Amin et al. | |
| 9,701,569 B2 | 7/2017 | Demartino et al. | |
| 9,809,488 B2 | 11/2017 | Beall et al. | |
| 10,046,542 B2 * | 8/2018 | Adib | B32B 7/06 |
| 2001/0022705 A1 | 9/2001 | Mori et al. | |
| 2003/0100146 A1 * | 5/2003 | Nakano | H05K 3/4697 438/118 |
| 2003/0126802 A1 * | 7/2003 | Rosenflanz | C04B 35/44 501/48 |
| 2004/0053039 A1 | 3/2004 | Ekstrom et al. | |
| 2004/0149368 A1 * | 8/2004 | Wang | C03C 14/004 156/89.12 |
| 2005/0016214 A1 | 1/2005 | Hsu et al. | |
| 2005/0199331 A1 * | 9/2005 | Nakano | H05K 3/4697 156/89.11 |
| 2006/0026994 A1 * | 2/2006 | Yoshizawa | C03B 27/044 65/114 |
| 2006/0093884 A1 * | 5/2006 | Seabaugh | H01M 4/8621 429/486 |
| 2006/0185335 A1 * | 8/2006 | Ichikawa | B01D 46/2459 55/523 |
| 2006/0199013 A1 * | 9/2006 | Malshe | C23C 30/005 428/408 |
| 2007/0051301 A1 * | 3/2007 | Hirooka | C30B 29/36 117/89 |
| 2007/0154666 A1 * | 7/2007 | Coonan | C03B 19/06 264/645 |
| 2007/0199348 A1 | 8/2007 | Gudgel et al. | |
| 2008/0041107 A1 | 2/2008 | Hsu et al. | |
| 2009/0186489 A1 | 7/2009 | Nakamura et al. | |
| 2009/0323157 A1 * | 12/2009 | Valentin | G02F 1/15245 359/265 |
| 2010/0011814 A1 * | 1/2010 | Zou | C03B 18/02 65/29.14 |
| 2010/0069218 A1 | 3/2010 | Baldi et al. | |
| 2010/0116413 A1 * | 5/2010 | Tanaka | B32B 18/00 156/89.12 |
| 2010/0304953 A1 * | 12/2010 | Liu | B01D 71/028 502/4 |
| 2011/0009254 A1 | 1/2011 | Schweiger et al. | |
| 2011/0092353 A1 | 4/2011 | Amin et al. | |
| 2011/0135964 A1 * | 6/2011 | Yagi | C03C 3/097 65/33.1 |
| 2011/0176277 A1 * | 7/2011 | Kaga | H05K 1/0306 264/650 |
| 2011/0186431 A1 * | 8/2011 | Horisaka | G01N 27/4077 204/424 |
| 2011/0189440 A1 | 8/2011 | Appleby et al. | |
| 2011/0198785 A1 * | 8/2011 | Kester | C04B 35/6263 264/642 |
| 2012/0094079 A1 | 4/2012 | Gabel et al. | |
| 2012/0196735 A1 | 8/2012 | Bogaerts et al. | |
| 2012/0291493 A1 | 11/2012 | Hsu et al. | |
| 2013/0224493 A1 * | 8/2013 | Gabel | C03B 32/02 65/33.1 |
| 2013/0277613 A1 * | 10/2013 | Miyagawa | C04B 35/505 252/301.4 R |
| 2013/0338267 A1 | 12/2013 | Appleby et al. | |
| 2014/0050659 A1 | 2/2014 | Rimer et al. | |
| 2014/0066285 A1 | 3/2014 | Beall et al. | |
| 2014/0124777 A1 * | 5/2014 | Nakatani | H05K 3/4673 257/43 |
| 2014/0134397 A1 | 5/2014 | Amin et al. | |
| 2014/0141285 A1 * | 5/2014 | Momono | C03C 10/0045 501/63 |
| 2014/0141960 A1 | 5/2014 | Borczuch-Laczka et al. | |
| 2014/0309793 A1 * | 10/2014 | Cheng | G05B 19/042 700/282 |
| 2014/0345328 A1 * | 11/2014 | Folgar | C03C 3/093 65/33.2 |
| 2015/0064474 A1 | 3/2015 | Dejneka et al. | |
| 2015/0086794 A1 * | 3/2015 | Akita | C03C 17/22 428/427 |
| 2015/0099124 A1 | 4/2015 | Beunet et al. | |
| 2015/0113801 A1 * | 4/2015 | Cao | B41C 1/00 29/825 |
| 2015/0140274 A1 | 5/2015 | Burke et al. | |
| 2015/0140513 A1 | 5/2015 | Burke et al. | |
| 2015/0265975 A1 * | 9/2015 | Liu | B01D 71/022 96/11 |
| 2015/0274602 A1 * | 10/2015 | Ishii | B28B 1/002 156/89.22 |
| 2015/0291468 A1 * | 10/2015 | Boek | C03C 21/002 428/410 |
| 2015/0329413 A1 | 11/2015 | Beall et al. | |
| 2016/0002092 A1 | 1/2016 | Kuehn | |
| 2016/0031736 A1 | 2/2016 | Muehlke et al. | |

(56) References Cited

U.S. PATENT DOCUMENTS

| | | |
|---|---|---|
| 2016/0046520 A1 | 2/2016 | Chenu et al. |
| 2016/0102010 A1 | 4/2016 | Beall et al. |
| 2016/0130175 A1 | 5/2016 | Siebers et al. |
| 2016/0159682 A1 | 6/2016 | Borczuch-Laczka et al. |
| 2016/0176752 A1 | 6/2016 | Gabel et al. |
| 2016/0194235 A1* | 7/2016 | Hart ............... C03C 21/002 428/410 |
| 2017/0022093 A1 | 1/2017 | Demartino et al. |
| 2017/0144921 A1 | 5/2017 | Beall et al. |
| 2017/0340420 A1 | 11/2017 | Burke et al. |
| 2018/0002227 A1 | 1/2018 | Dai et al. |
| 2018/0097142 A1* | 4/2018 | Moriyama ............... C30B 9/06 |
| 2018/0155235 A1 | 6/2018 | Beall et al. |
| 2018/0169826 A1* | 6/2018 | Bankaitis ............. B24B 37/042 |
| 2018/0182549 A1* | 6/2018 | Koide ................ C04B 35/638 |
| 2018/0210118 A1* | 7/2018 | Gollier ................... C03C 4/18 |
| 2018/0272783 A1* | 9/2018 | Ishihara ............. C04B 37/003 |
| 2018/0362390 A1 | 12/2018 | Claireaux et al. |
| 2018/0370194 A1 | 12/2018 | Claireaux et al. |
| 2018/0370846 A1 | 12/2018 | Harrison et al. |
| 2019/0169060 A1 | 6/2019 | Jones et al. |
| 2019/0169061 A1 | 6/2019 | Jones et al. |
| 2019/0194062 A1 | 6/2019 | Wlfinger et al. |
| 2019/0300426 A1 | 10/2019 | Fu et al. |
| 2020/0017398 A1* | 1/2020 | Click ..................... H05K 5/03 |
| 2020/0017399 A1 | 1/2020 | Click et al. |
| 2020/0156994 A1 | 5/2020 | Li et al. |
| 2020/0263317 A1* | 8/2020 | Mori ................... C30B 19/12 |
| 2022/0267205 A1 | 8/2022 | Chien et al. |

FOREIGN PATENT DOCUMENTS

| | | | |
|---|---|---|---|
| CN | 101714504 A | 5/2010 | |
| CN | 101962295 A | 2/2011 | |
| CN | 102384654 A | 3/2012 | |
| CN | 103003212 A | 3/2013 | |
| CN | 105731808 A | 7/2016 | |
| CN | 105753314 A | 7/2016 | |
| CN | 105884184 A | 8/2016 | |
| CN | 105899469 A | 8/2016 | |
| CN | 106660861 A | 5/2017 | |
| CN | 107001120 A | 8/2017 | |
| CN | 107265845 A | 10/2017 | |
| CN | 206580739 U | 10/2017 | |
| CN | 206683413 U | 11/2017 | |
| CN | 107619193 A | 1/2018 | |
| CN | 107902909 A | 4/2018 | |
| CN | 109071316 A | 12/2018 | |
| CN | 111954646 A | 11/2020 | |
| CN | 113896410 * | 1/2022 | ............ C03B 32/02 |
| DE | 102010027461 A1 * | 1/2012 | ............ C03B 32/02 |
| DE | 202018102534 U1 | 5/2018 | |
| EP | 0508131 A2 | 10/1992 | |
| EP | 2323955 A1 | 5/2011 | |
| EP | 2905113 A1 * | 8/2015 | ............ B01J 35/04 |
| EP | 3293157 A1 | 3/2018 | |
| JP | 62-070239 A | 3/1987 | |
| JP | 02-116639 A | 5/1990 | |
| JP | 05-043263 A | 2/1993 | |
| JP | 05032334 B2 | 5/1993 | |
| JP | 2001-097740 A | 4/2001 | |
| JP | 2002-087835 A | 3/2002 | |
| JP | 2006-232661 A | 9/2006 | |
| JP | 2008-303073 A | 12/2008 | |
| JP | 2014012617 A | 1/2014 | |
| JP | 2015069669 A | 4/2015 | |
| JP | 2016-108218 A | 6/2016 | |
| JP | 2017-530933 A | 10/2017 | |
| TW | 201623179 A | 7/2016 | |
| TW | 201731783 A | 9/2017 | |
| WO | 2010/002477 A1 | 1/2010 | |
| WO | 2012/121116 A1 | 9/2012 | |
| WO | 2016/057748 A1 | 4/2016 | |
| WO | 2016/154235 A1 | 9/2016 | |
| WO | 2017/104513 A1 | 6/2017 | |
| WO | 2019/022033 A1 | 1/2019 | |
| WO | 2019/191358 A1 | 10/2019 | |

OTHER PUBLICATIONS

CeraGlide Boron Nitride coatings as provided by https://www.bn.saint-gobain.com/products/coatings DATAsheet (Year: 2019).*

CeraGlide Boron Nitride coatings as provided by https://www.bn.saint-gobain.com/products/coatings Bulletin (Year: 2019).*

Eppler, "Glass formation and recrystallization in the lithium metasilicate region of the system $Li_2O$—$Al_2O_3$—$SiO_2$," Journal of the American Ceramic Society 46(2) 1963, pp. 97-101.

Reddy et al; "Fracture Toughness Measurement of Glass and Ceramic Materials Using Chevron-Notched Specimens," J. Am. Ceram. Soc., 71 [6], C-310-C-313 (1988).

Bubsey et al; "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).

Tang et al; "Automated Apparatus for Measuring the Frangibility and Fragmentation of Strengthened Glass"; Experimental Mechanics (2014) 54: 903-912.

International Search Report and Written Opinion of the European International Searching Authority; PCT/US2019/040491; dated Oct. 8, 2019; 12 Pgs.

Chinese Patent Application No. 201980048034.9, Office Action dated Jul. 4, 2022, 5 pages (English Translation Only), Chinese Patent Office.

* cited by examiner

METHODS OF CERAMMING GLASS ARTICLES HAVING IMPROVED WARP

CROSS-REFERENCE TO RELATED APPLICATIONS

This application claims the benefit of priority under 35 U.S.C. § 119 of U.S. Provisional Application Ser. No. 62/698,563 filed on Jul. 16, 2018 and U.S. Provisional Application Ser. No. 62/749,815 filed on Oct. 24, 2018, the contents of each of which are relied upon and incorporated herein by reference in their entireties.

BACKGROUND

Field

The present specification generally relates to methods and apparatus for ceramming glass sheets and, more particularly, to methods of ceramming glass sheets having improved warp.

Technical Background

Conventional ceram processes utilize ceramic and/or refractory materials as setters. However, such materials are incapable of producing a glass ceramic having an optical quality suitable for use in optical displays. Without being bound by theory, it is believed that the heat transfer and heat capacity limitations of the ceramic and/or refractory materials can warp or produce a skin effect on the glass ceramic.

Warp may also be introduced during the manufacturing process due to the stacking of the glass sheets. In particular, warping may result from the glass sheets in a stack sticking to the other glass sheets and/or the setter, thickness variations of the glass sheets throughout the stacks, and the load applied to the glass stack.

Accordingly, alternative methods and apparatus are needed that are suitable for use in producing glass ceramic sheets having a high optical quality and reduced warping.

SUMMARY

According to one embodiment, a method of ceramming a plurality of glass sheets includes positioning a first portion of the plurality of glass sheets in a first stack between a first setter plate and a second setter plate and a second portion of the plurality of glass sheets in a second stack between the second setter plate and a third setter plate on top of the first stack in a glass stack configuration, and exposing the glass stack configuration to a ceramming cycle to ceram the plurality of glass sheets. Each of the first portion of the plurality of glass sheets and the second portion of the plurality of glass sheets comprise from 5 glass sheets to 15 glass sheets.

According to another embodiment, a method of ceramming a plurality of glass sheets includes machining each of the plurality of glass sheets to reduce a thickness variation in the plurality of glass sheets, positioning the plurality of glass sheets between a first setter plate and a second setter plate in a glass stack configuration, and exposing the glass stack configuration to a ceramming cycle to ceram the plurality of glass sheets.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments of printing compositions, methods of printing on substrates, and printed substrates and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
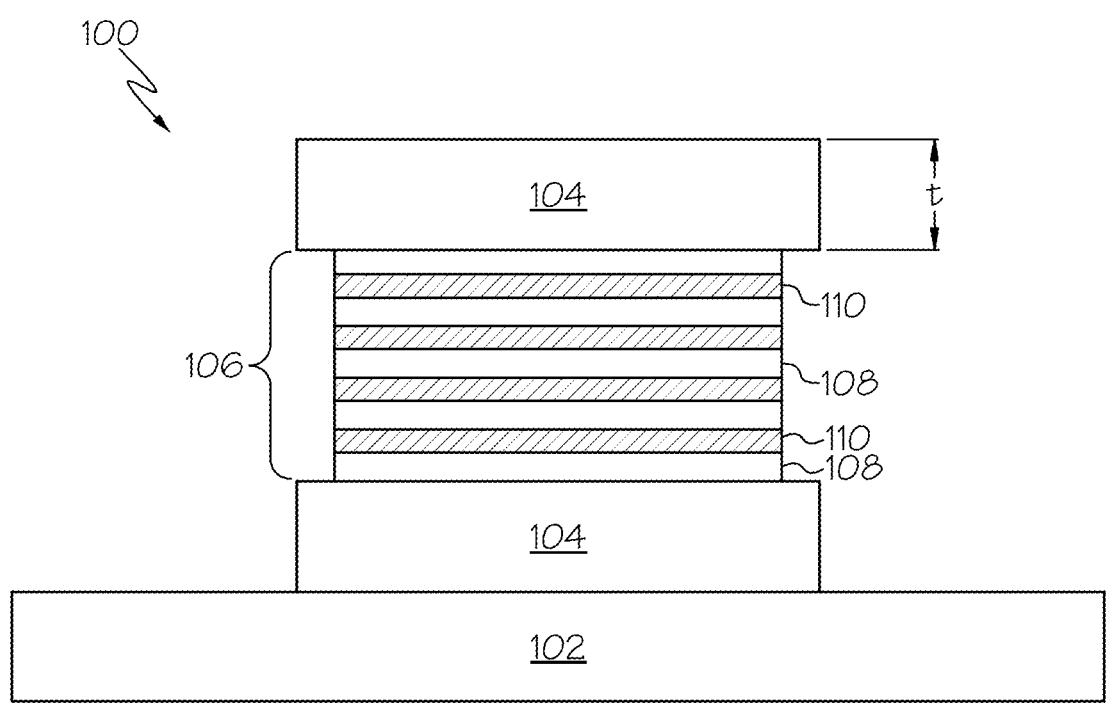
FIG. 1 is a schematic illustration of a glass stack configuration in accordance with one or more embodiments described herein.

Reference will now be made in detail to various embodiments of methods and apparatus for forming glass ceramic articles having improved optical quality and reduced warping, examples of which are illustrated in the accompanying drawings. Whenever possible, the same reference numerals will be used throughout the drawings to refer to the same or like parts.

In general, described herein are glass stack configurations including a carrier plate, setter plates, and glass sheets for thermal treatment of the glass sheets to form glass ceramic articles. The glass stacking configurations and components described herein are selected to improve thermal uniformity throughout a glass stack during ceramming processes while maintaining or even reducing the stresses in the resultant glass ceramic article. Accordingly, the glass ceramic articles made according to the various embodiments described herein exhibit improved optical qualities and less warp than glass ceramic articles made according to conventional processes. Various embodiments of carrier plates, setter plates, parting agent compositions, and methods of stacking glass sheets will be described herein with specific reference to the appended drawings.

Directional terms as used herein—for example up, down, right, left, front, back, top, bottom, vertical, horizontal—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In general, a process for forming a glass ceramic includes forming a glass article and ceramming the glass article to transform the glass article into a glass ceramic form. Referring to FIG. 1, an example stack configuration 100 for ceramming is illustrated. The stack configuration 100 includes a carrier plate 102 supporting two setter plates 104, and a glass stack 106 positioned between the setter plates 104.

In some embodiments, insulation layers (not shown) may be located on the top surface of the upper setter plate 104 and one the bottom surface of the lower setter plate 104. The insulation layers may be formed from any material having a low thermal conductivity, and can reduce or even eliminate axial temperature gradients of the glass sheets 108 on the top and bottom of the glass stack 106.

As shown in FIG. 1, the glass stack 106 includes a plurality of glass sheets 108, each glass sheet 108 being separated from an adjacent glass sheet 108 by a parting agent layer 110. As will be described in greater detail below, the parting agent layer 110 reduces or even eliminates the sticking of the glass sheets 108 in the glass stack 106 during the ceramming process. Although not depicted in FIG. 1, in some embodiments, the glass stack 106 may further include a parting agent layer 110 between the glass sheet 108 and the setter plate 104. In other embodiments, such as in various embodiments described below, the setter plate 104 is made from a material that does not react with the glass sheet 108, and a parting agent layer 110 is not required to prevent interactions between the glass sheet 108 and the setter plate 104.

Generally, to form the glass ceramic, the glass stack 106 is heated at a temperature above its annealing point for a time sufficient to develop crystal nuclei (also called a nucleation phase). The heat treatment can be performed, for example, in a lehr or furnace. After being heated above its annealing point, the glass is then further heated, usually at a higher temperature between the glass annealing point and the glass softening point, to develop the crystal phase (also called a crystallization phase). In various embodiments, the heat treatment, or ceramming process, includes heating the glass stack to a nucleation temperature, maintaining the nucleation temperature for a predetermined period of time, heating the glass stack to a crystallization temperature, and maintaining the crystallization temperature for a predetermined period of time. In some embodiments, the step of heating the glass stack to a nucleation temperature can include heating the glass stack to a nucleation temperature of about 700° C. at a rate of 1-10° C./min. The glass stack may be maintained at the nucleation temperature for a time of from about ¼ hour to about 4 hours. The step of heating the glass stack to the crystallization temperature can include heating the glass stack to a crystallization temperature of about 800° C. at a rate of 1-10° C./min. The glass stack may be maintained at the nucleation temperature for a time of from about ¼ hour to about 4 hours.

However, it is contemplated that other heat treatment schedules (including varying times and/or temperatures) can be used, depending on the particular embodiment. In particular, the temperature-temporal profile of heat treatment steps are selected to produce one or more of the following attributes: crystalline phase(s) of the glass ceramic, proportions of one or more major crystalline phases and/or one or more minor crystalline phases and residual glass, crystal phase assemblages of one or more predominate crystalline phase and/or one or more minor crystalline phases and residual glass, and grain sizes or grain size distributions among one or more major crystalline phases and/or one or more minor crystalline phases, which in turn may influence the final integrity, quality, color and/or opacity of the resultant glass ceramic article.

Figure 2:
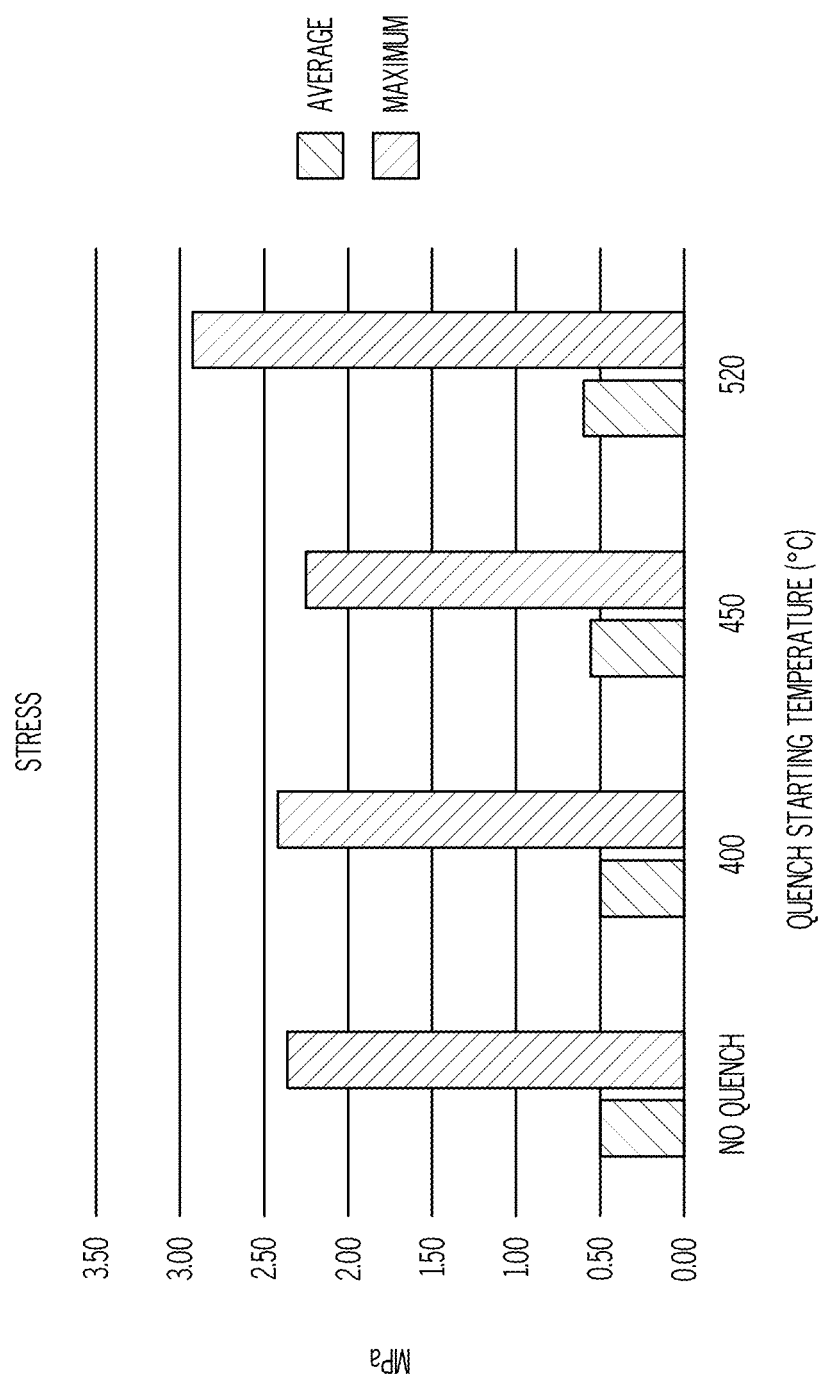
FIG. 2 is a graph showing the average and maximum stress (y-axis; MPa) in glass ceramic articles for various quench starting temperatures (x-axis)

Following heating to the nucleation temperature and maintaining that temperature for the predetermined time, the glass stack is cooled back to room temperature. In various embodiments, the cooling rate is controlled down to a temperature of about 450° C., after which the glass ceramic article may be quenched without impacting the stress, as shown in FIG. 2. Accordingly, in various embodiments, the ceramming process includes a controlled cooling at a rate of about 4° C./min from the maximum temperature to a temperature of about 450° C., followed by a quenching step to bring the temperature to approximately room temperature.

Having described the stack configuration 100 in general, additional detail will now be provided with regard to the components of the stack configuration 100.

Carrier Plate

In various embodiments, the carrier plate 102 supports two or more setter plates 104. The structure and material of the carrier plate 102 may be selected to control the thermal uniformity of the glass sheets loaded on top of it in the stack configuration 100. In some embodiments, the carrier plate 102 has an open carrier design (shown in FIG. 3), while in other embodiments, the carrier plate 102 has a closed carrier design (shown in FIG. 4). In the embodiment depicted in FIG. 3, the carrier plate 102 is approximately 17% solid metal (e.g., steel), while the carrier plate 102 in the embodiment depicted in FIG. 4 is a hollow plate made of reaction bonded silicon carbide beams with approximately 45% solid metal.

Figure 4:
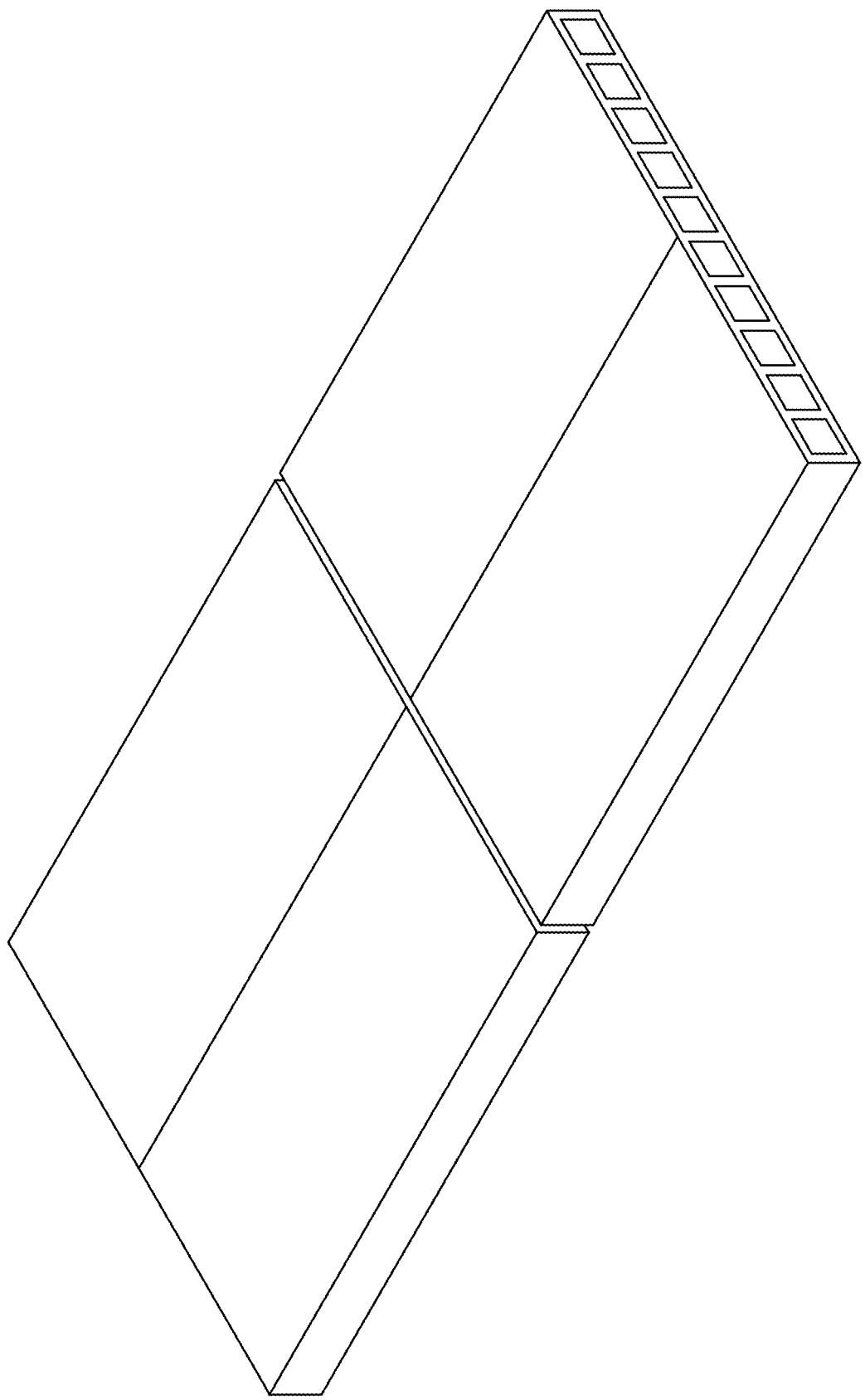
FIG. 4 is a schematic illustration of a carrier plate having a hollow plate configuration in accordance with one or more embodiments described herein.
Figure 5:
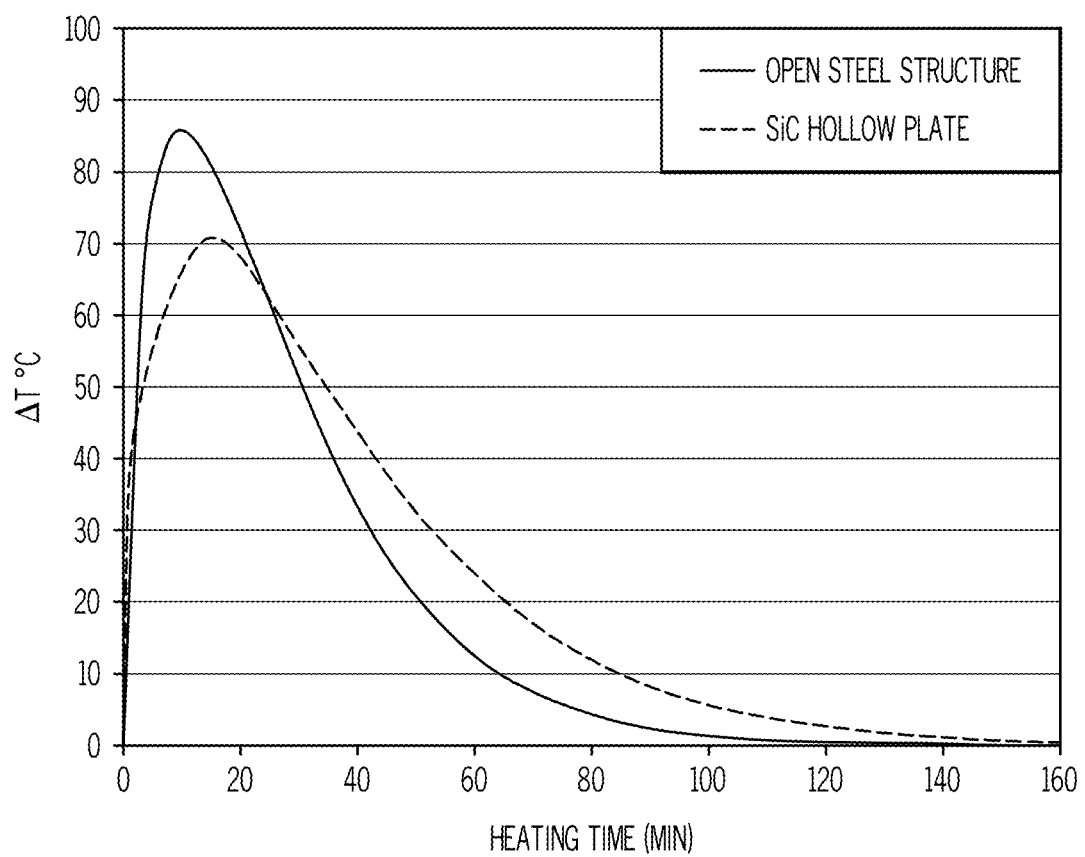
FIG. 5 is a graph plotting the modeled $\Delta T$ (° C.; y-axis) as a function of heating time (minutes; x-axis) for an open grid steel carrier plate and a silicon carbide hollow carrier plate in accordance with one or more embodiments described herein.

To evaluate the thermal impact of the carrier plate, a thermal model assuming production scale capacity with 9 stacks and 23 glass sheets in each stack on a carrier plate and 8 mm thick setter plates made from reaction bonded silicon carbide was run. As shown in the modeled data of FIG. 5, glass stacks on the hollow carrier plate exhibit reduced thermal uniformity as compared to glass stacks on the open steel carrier plate due to heat transfer. In particular, for the carrier made of silicon carbide beams (FIG. 4), larger glass stack temperature variations are expected as compared to the carrier made of the open steel grid design (FIG. 3), except at the very early stage of heating when the glass temperatures are low. Additionally, the blocking of direct radiation by the carrier plate also increases the overall heating time, despite the fact that the reaction bonded silicon carbide is a better heat conductor than steel.

Figure 3:
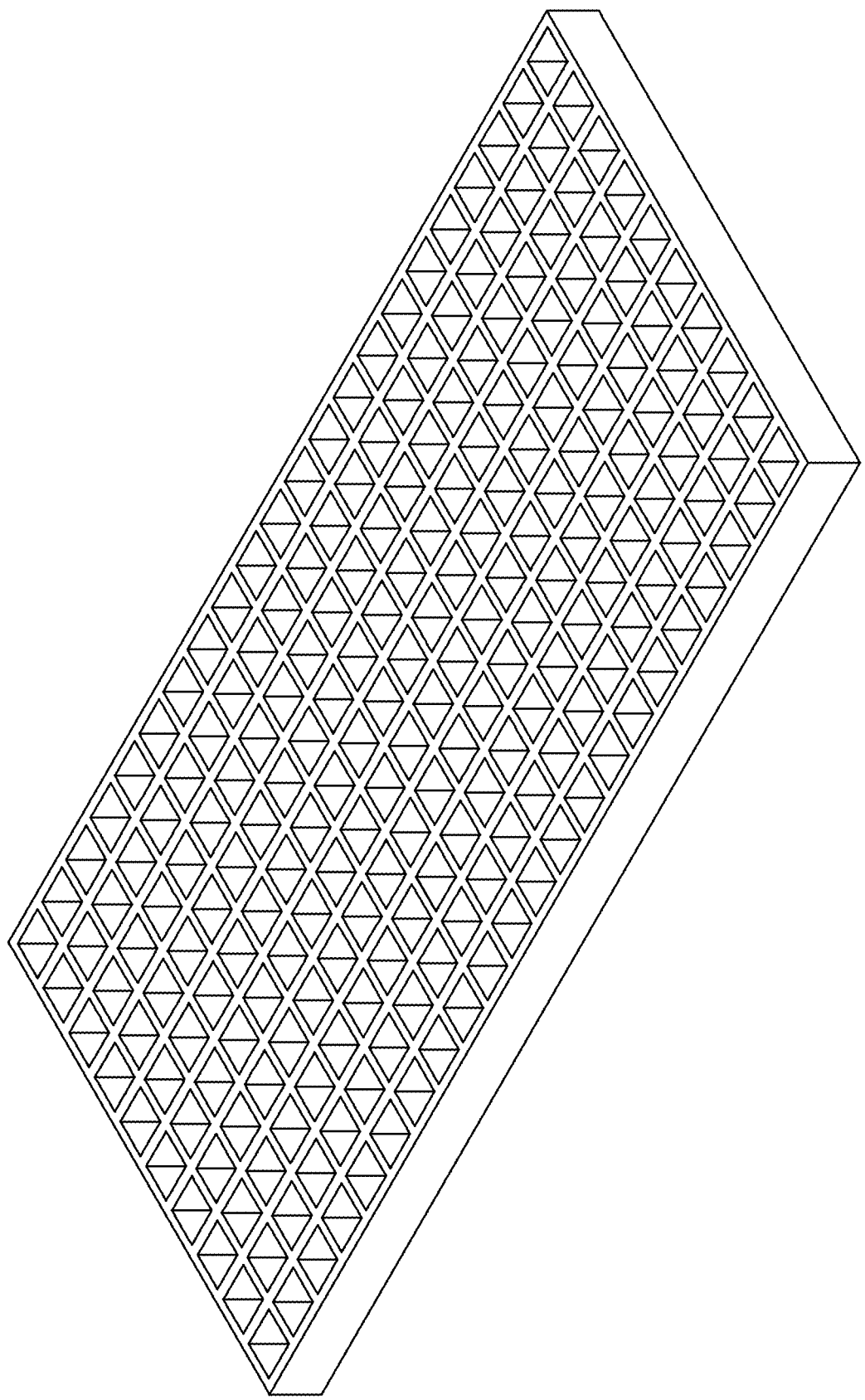
FIG. 3 is a schematic illustration of a carrier plate having an open grid configuration in accordance with one or more embodiments described herein.

Accordingly, although various designs and materials may be employed for the carrier plate 102, in various embodiments, the carrier plate is made from steel and has an open grid design, as depicted in FIG. 3.

Setter Plate

As shown in FIG. 1, in various embodiments, the carrier plate 102 supports at least two setter plates 104. For example, although the embodiment shown in FIG. 1 includes a single glass stack 106 with a setter plate 104 above the glass stack 106 and a setter plate 104 between the glass stack 106 and the carrier plate 102, it is contemplated that additional setter plates 104 may be included, such as being positioned within the glass stack 106, and/or by positioning multiple glass stacks 106 on the carrier plate 102, each glass stack 106 having at least a setter plate 104 above the glass stack 106 and a setter plate 104 between the glass stack 106 and the carrier plate 102.

While most conventional ceram processes utilize ceramic and refractory materials to form setter plates, such materials have heat transfer and heat capacity limitations which make them unsuitable for producing a high optical quality that is desired or required for certain applications. Additionally, setter plates made from such materials can experience thermal expansion, oxidation, and creep, which can in turn lead to warp in the glass ceramic article.

Moreover, the setter plates 104 binding the glass stack 106 provide a lateral heat transfer path to spread radiant heat from heating elements, which may lower the in-plane glass sheet temperature variations. Minimizing the temperature variations may in turn lead to a reduction in in-plane stresses and warp in the glass ceramic article. Accordingly, in various embodiments, the setter plates 104 are selected to maximize the reduction in glass sheet temperature variation. In particular, the setter plates 104 are selected to have a particular specific heat capacity, density, and thermal diffusivity.

According to various embodiments, the setter plates have a specific heat capacity ($c_p$) of from about 670 J/kg*K to about 850 J/kg*K, as measured in accordance with ASTM E1461 at room temperature. For example, the setter plates may have a specific heat capacity of from about 670 J/kg*K to about 850 J/kg*K, from about 670 J/kg*K to about 800 J/kg*K, from about 670 J/kg*K to about 750 J/kg*K, or from about 670 J/kg*K to about 700 J/kg*K, as measured in accordance with ASTM E1461 at room temperature and all ranges and subranges therebetween. Without being bound by theory, it is believed that when the specific heat capacity is outside of this range, the material is not able to give up heat and accept heat at the appropriate rate which causes stress and warp in the glass in stacking configurations.

The setter plates in various embodiments additionally or alternatively may be selected to have a bulk density of greater than about 2500 $kg/m^3$, as measured in accordance with ASTM C20. For example, the setter plates may have a bulk density of from about 2500 $kg/m^3$ to about 4000 $kg/m^3$, from about 2750 kg/m³ to about 3750 kg/m³, or from about 3000 kg/m³ to about 3500 kg/m³, as measured in accordance with ASTM C20 and all ranges and subranges therebetween. Without being bound by theory, it is believed that materials having bulk densities in this range have low porosity and do not significantly increase the weight in the stack. A bulk density that is too low can lead to material deterioration over time and decreased life use of the material, whereas a bulk density that is too high can lead to stress in the stack due to increased force on the glass.

Moreover, in various embodiments, the setter plates have a thermal diffusivity of greater than about 2.50×10⁻⁵ m²/s. For example, the setter plates may have a thermal diffusivity of from about 2.50×10⁻⁵ m²/s to about 5.50×10⁻⁴ m²/s, from about 3.0×10⁻⁵ m²/s to about 5.00×10⁻⁴ m²/s from about 4.0×10⁻⁵ m²/s to about 4.50×10⁻⁴ m²/s, from about 4.50× 10⁻⁵ m²/s to about 4.00×10⁻⁴ m²/s, from about 5.00×10⁻⁵ m²/s to about 3.50×10⁻⁴ m²/s, from about 5.50×10⁻⁵ m²/s to about 3.00×10⁻⁴ m²/s, from about 6.00×10⁻⁵ m²/s to about 2.50×10⁻⁴ m²/s, from about 6.50×10⁻⁵ m²/s to about 2.0× 10⁻⁴ m²/s, from about 7.00×10⁻⁵ m²/s to about 2.00×10⁻⁴ m²/s, or from about 7.50×10⁻⁵ m²/s to about 1.50×10⁻⁴ m²/s and all ranges and subranges therebetween. Without being bound by theory, if the thermal diffusivity is too low, the material will take too long to heat up and cool down causing thermal gradients in the stack which will lead to stress and warp. However, if the thermal diffusivity is too high, it could also lead to stress due to imparting thermal gradients in the stack. Glass sheets in contact with the setter plates would be affected by heat transfer at different rates as opposed to the glass sheets in the center of the stack. Thermal diffusivity a can be defined according to the following equation:

$$\alpha = \frac{k}{\rho c_p}$$

where k is thermal conductivity (W/m*K), ρ is density (kg/m³), and $c_p$ is specific heat capacity (J/kg*K).

Accordingly, in various embodiments, the setter plates have a thermal conductivity (k) of greater than about 100 W/m-K, greater than about 125 W/m-K, greater than about 150 W/m-K, greater than about 175 W/m-K, or even greater than about 180 W/m-K, as measured in accordance with ASTM E1461 at room temperature. For example, the setter plate may have a thermal conductivity of from about 100 W/m-K to about 350 W/m-K, from about 125 W/m-K to about 325 W/m-K, from about 150 W/m-K to about 300 W/m-K, from about 175 W/m-K to about 275 W/m-K, or from about 180 W/m-K to about 250 W/m-K, as measured in accordance with ASTM E1461 at room temperature and all ranges and subranges therebetween. Without being bound by theory, thermal conductivity too high or too low can induce thermal gradients in the stack leading to stress and warp.

Various materials having the desired specific heat capacity, density, and thermal diffusivity may be suitable for use in forming the setter plates described herein. One example material that is particularly suitable for use is reaction bonded silicon carbide (SiSiC). In embodiments, the setter plate 104 may comprise from about 85 wt % to about 90 wt % reaction bonded silicon carbide. The setter plate 104 may further comprise from about 10 wt % to about 15 wt % silicon metal (Si) and binding agents. Commercially available reaction bonded silicon carbide products that may be suitable for use in forming the setter plate 104 can include, by way of example and not limitation, CRYSTAR RB™ available from Saint-Gobain Ceramic Materials.

To confirm the impact of the thermal properties of the material used to form the setter plates, three different materials were used to form setter plates having a thickness of 8 mm. In particular, Example A was formed from reaction bonded silicon carbide, Comparative Example 1 was formed using nitride bonded silicon carbide, and Comparative Example 2 was formed using silicon refractory board. The thermal properties of each of these materials are provided in Table 1.

TABLE 1

| Thermal Properties of Setter Plate Materials | | | |
|---|---|---|---|
| | Nitride Bonded SiC | Reaction Bonded (SiSiC) | Si Refractory Board |
| Thermal Conductivity at room temperature (W/m * K) | 31 | 185 | 0.6 |
| Bulk Density (kg/m³) | 2200 | 3030 | 2100 |
| Specific Heat at room temperature (J/kg * K) | 663 | 670 | 878 |
| Thermal Diffusivity (m²/s) | 2.13E−05 | 9.11E−05 | 3.25E−07 |

Figure 6:
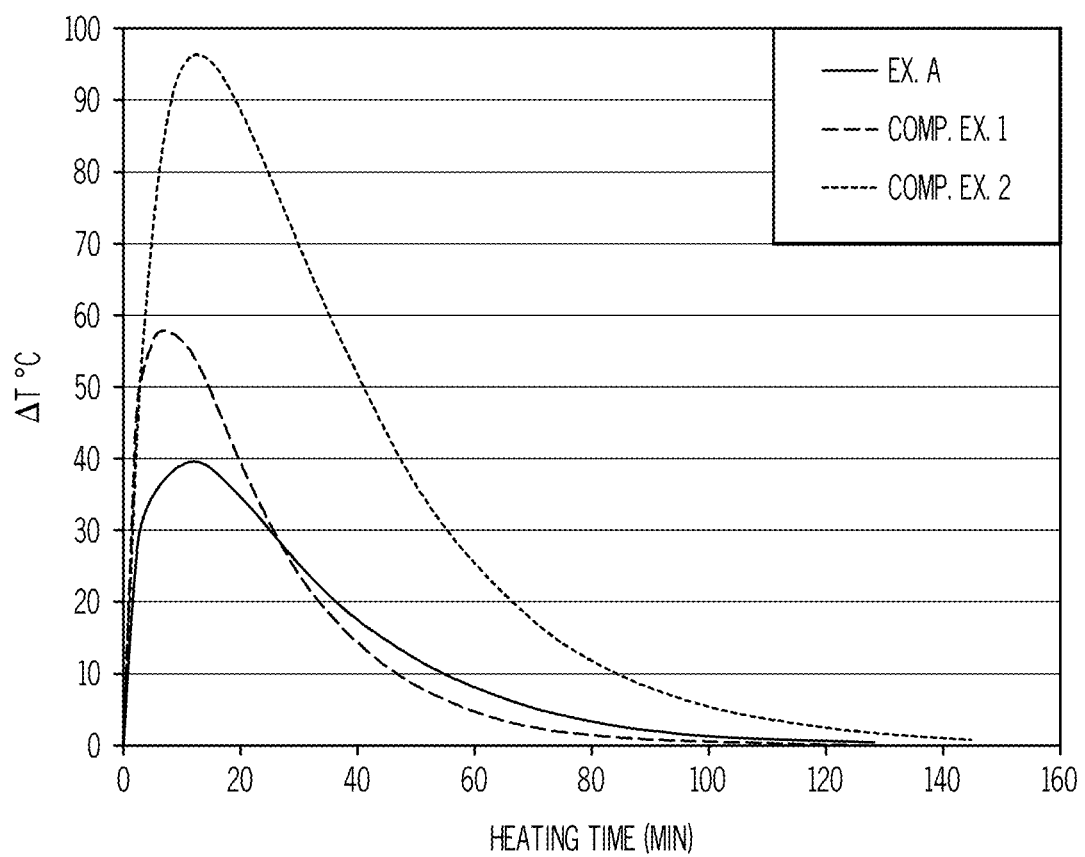
FIG. 6 is a graph plotting the modeled $\Delta T$ (° C.; y-axis) as a function of heating time (minutes; x-axis) for the setter plates of Example A and Comparative Examples 1 and 2.

The ΔT of the glass stack during heating ramp up was measured. The results are shown in FIG. 6. In particular, as shown in FIG. 6, the reaction bonded silicon carbide exhibits a reduced heating time and a reduced ΔT during the process. Comparative Example 2 using setter plates formed from silicon refractory board exhibited a significantly larger temperature variation, most likely because it is a poor heat conductor. However, the larger thermal diffusivity of Example A and Comparative Example 1 (nitride bonded silicon carbide) showed more uniform temperatures.

Figure 7:
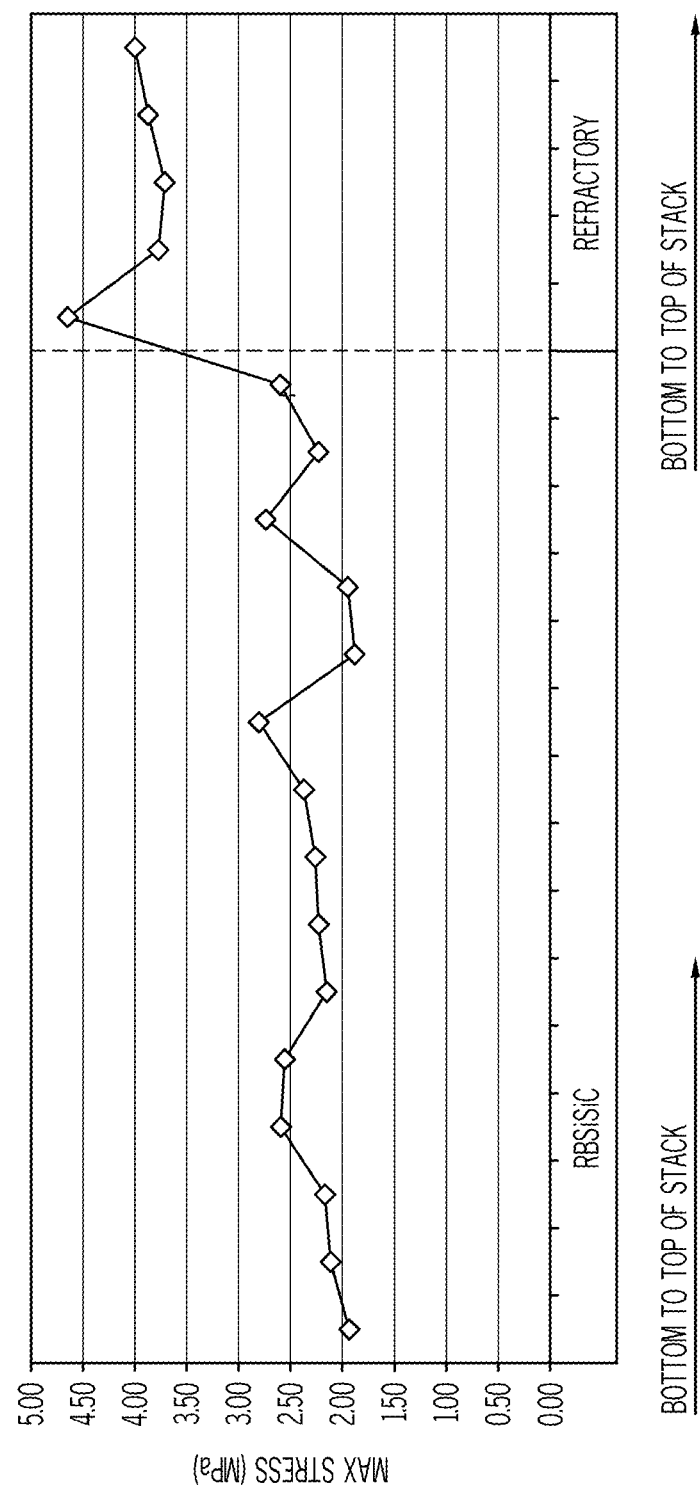
FIG. 7 is a graph plotting the maximum stress (MPa; y-axis) for two different setter materials in which reaction bonded silicon carbide is used on the left and silicon refractory board is used on the right.

In addition to decreasing the temperature variation in the glass stack, the setter plate 104 of various embodiments is made from a material that imparts lower stress as compared to conventional materials. For example, the thermal diffusivity of the reaction bonded silicon carbide imparts lower stress in the glass ceramic article following ceramming heat treatment as compared to conventional setter plate materials. As shown in FIG. 7, the reaction bonded silicon carbide produced a lower maximum stress on the stacks (left hand side of the graph) as compared to stacks in contact with a silicon refractory board setter plate (right hand side of the graph). Without being bound by theory, it is believed that the reduced temperature delta resulting from the thermal diffusivity of the reaction bonded silicon carbide reduces stress in the glass ceramic article as it grows crystals and phase transformation occurs in the article. The stress reduction directly impacts the warp in the glass ceramic article. In particular, increased stresses induce higher warp in the article, which can make it unusable for certain applications, such as handheld electronic displays. However, the use of reaction bonded silicon carbide reduces the stress in the glass ceramic article, thereby providing low warp in the final product.

Figure 8:
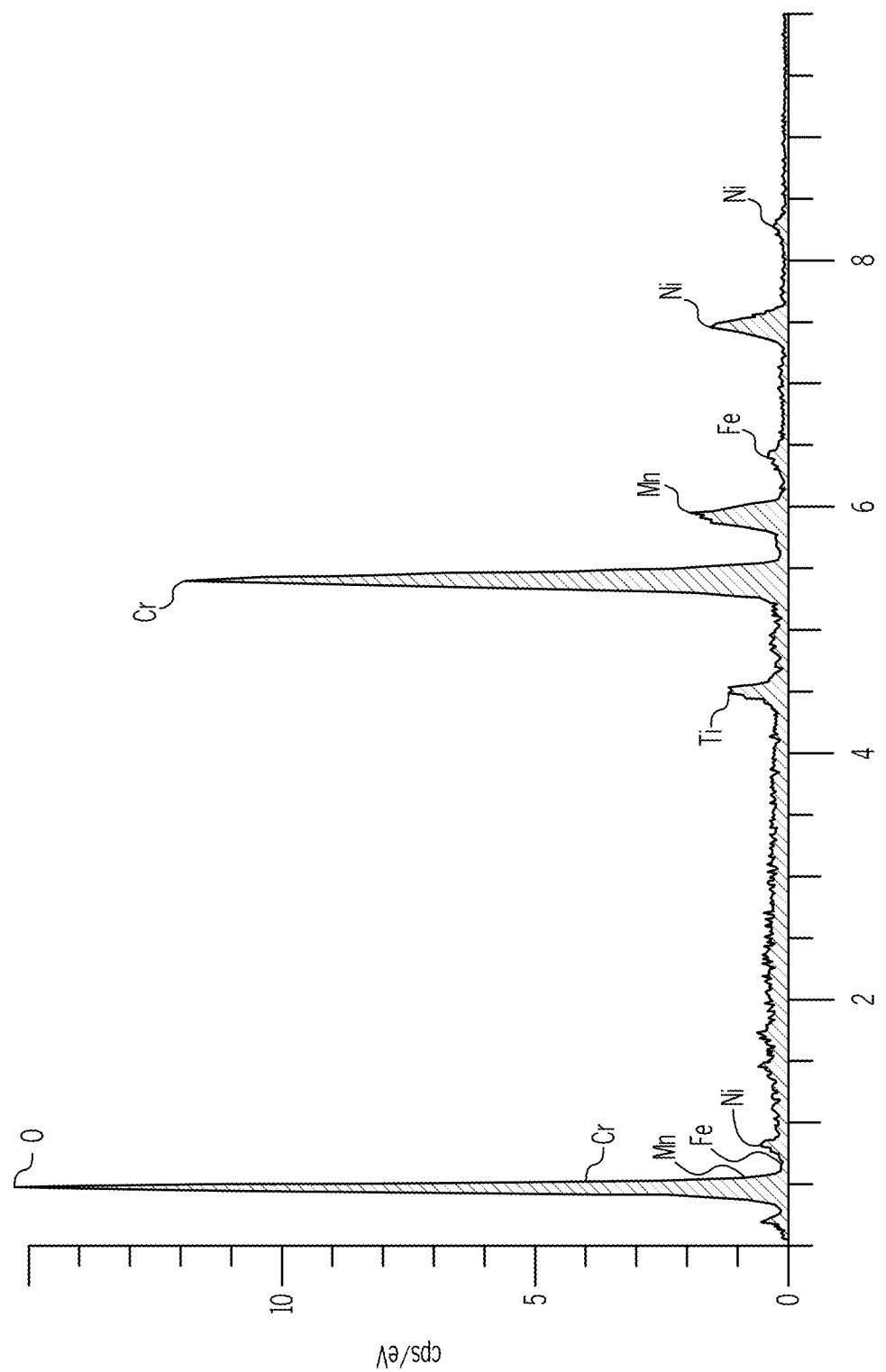
FIG. 8 depicts EDX (energy dispersive X-ray) showing the lack of Si on the surface of reaction-bonded silicon carbide setter plates post ceramming in accordance with one or more embodiments described herein.

In various embodiments, the material used to form the setter plate 104 is further selected based on its lack of reactivity with both the carrier plate 102 and the glass ceramic article. Reaction bonded silicon carbide is an example material that demonstrates low or even no reaction with materials typically used to form the carrier plate 102. In particular, setter plates made from reaction bonded silicon carbide in contact with stainless steel alloy and Ni-based super alloy metal carrier plates were tested up to 800° C. in air for 24 hour and for 100 hours. As shown in FIG. 8, SEM (scanning electron microscope) and EDX examination showed that there was no reaction of the metals with the reaction bonded silicon carbide. Specifically, the lack of Si found on the carrier plate surfaces showed that there was no reaction with the free Si in the reaction bonded silicon carbide microstructure.

Figure 9:
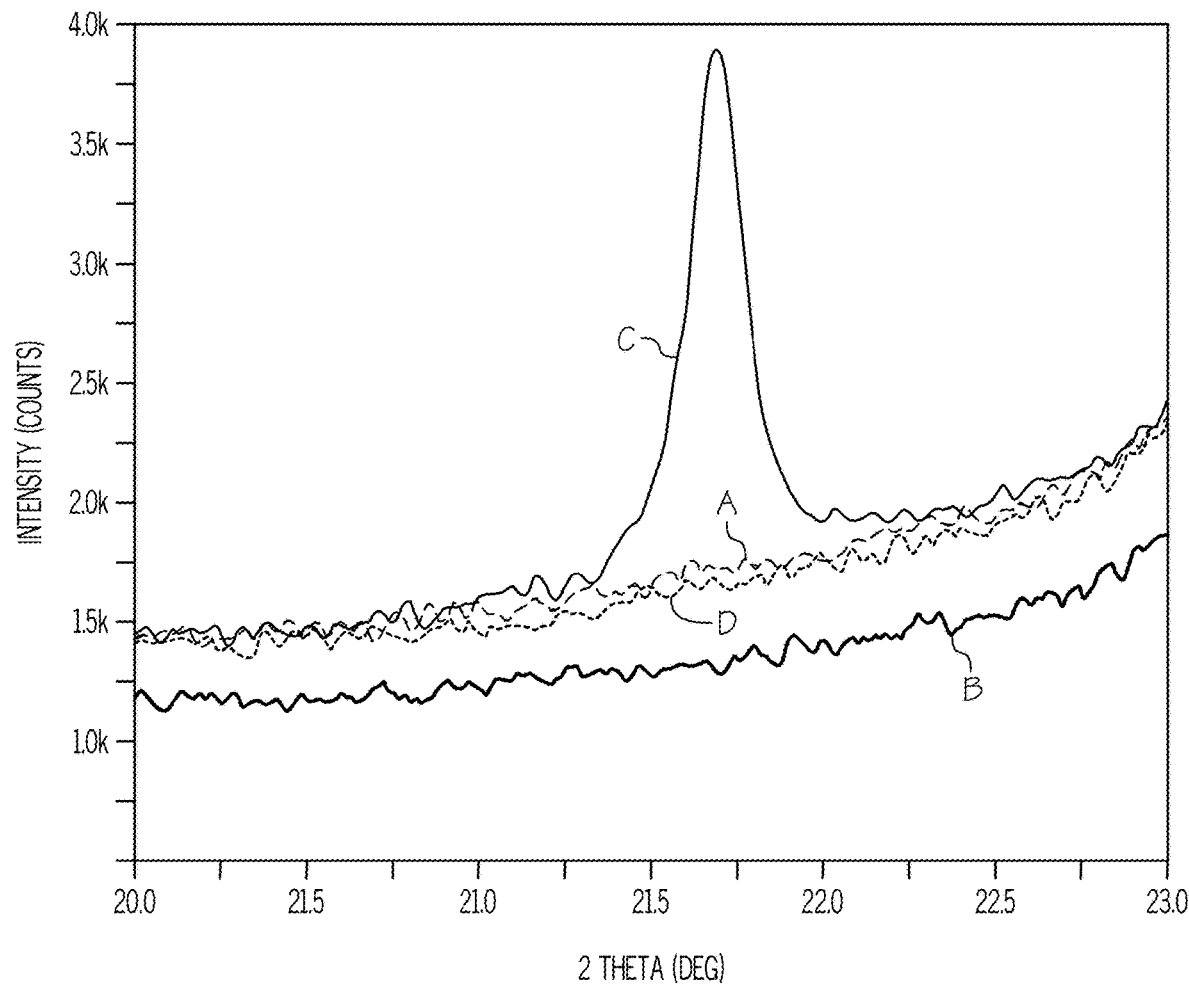
FIG. 9 depicts the XRD (X-ray diffraction) of various glass ceramic articles in accordance with one or more embodiments described herein.

Moreover, Li-based glass ceramics in contact with reaction bonded silicon carbide material during a thermal ceramming process do not exhibit any skin effects, according to XRD phase assemblage characterization. For example, as shown in FIG. 9, the glass in contact with the reaction bonded silicon carbide setter plate (A) is similar in phase to the bulk glass (B).

In addition to having improved thermal properties over other materials, reaction bonded silicon carbide has a low porosity (<1%), which can increase the life of the setter plate during thermal cycling due to increased resistance to oxidation, cracking, and reactivity through diffusion with other elements and materials.

In various embodiments, the setter plate 104 is also dimensioned to reduce warp in the glass ceramic article. In particular, the thickness of the setter plate 104 and the flatness of the setter plate 104 are controlled to reduce both warp and stress in the glass ceramic.

Figure 10:
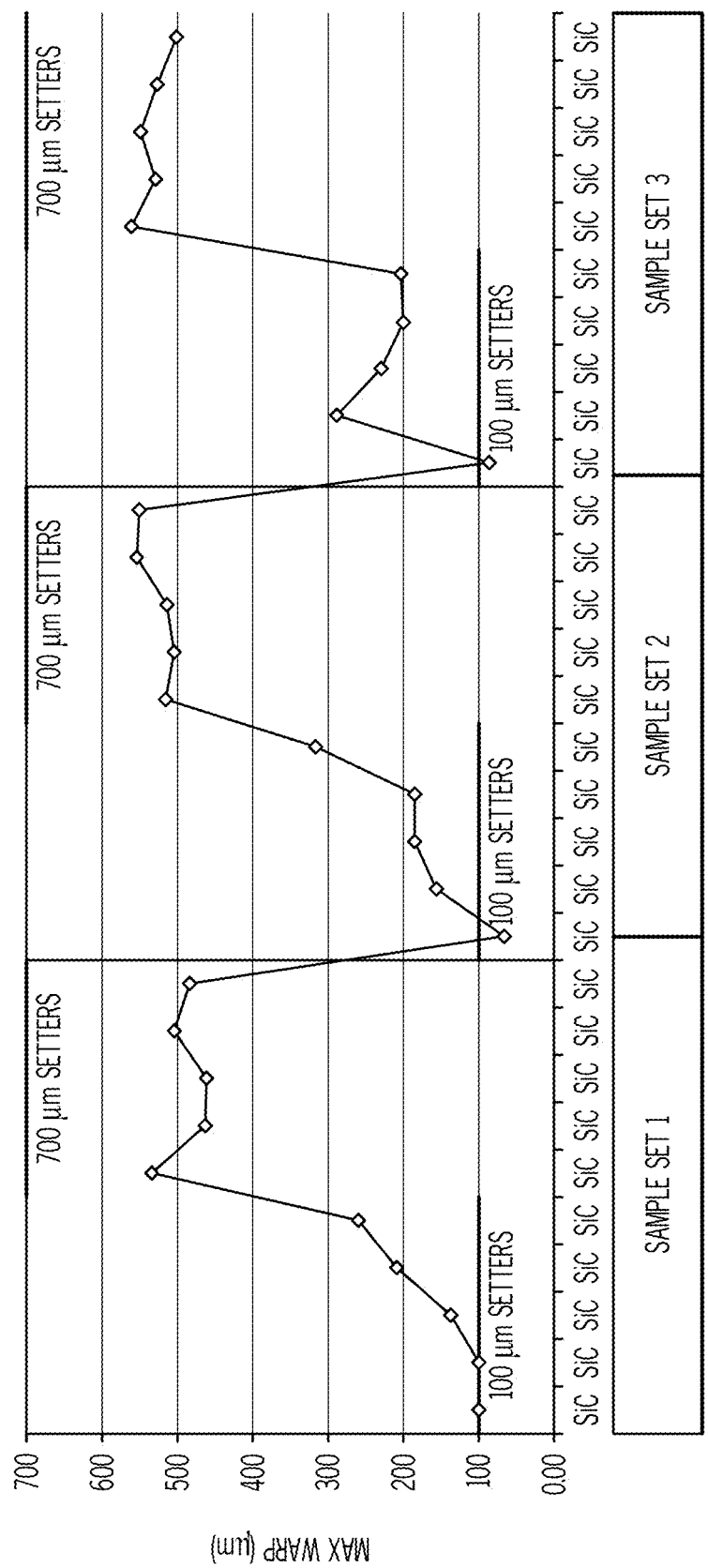
FIG. 10 is a graph of the maximum warp (μm; y-axis) for various setter plate flatnesses and additional weight in accordance with one or more embodiments described herein.

During the ceramming process, the glass sheets 108 forming the glass stack 106, which is in contact with the setter plates 104, move and conform to the flatness of the setter plate 104. In various embodiments, the setter plate 104 may be machined to obtain a particular flatness after formation. As used herein, the term "flatness" refers to a tolerance zone defined by two parallel planes within which the surface lies. For example, a flatness of 100 µm means that the surface must lie entirely between two parallel planes that are at most 100 µm apart. The impact of the flatness of the setter plate 104 on the flatness of the glass ceramic article is shown in FIG. 10. Specifically, as shown in FIG. 10, the maximum warp of the glass ceramic article is decreased for setter plates having a flatness of 100 µm as compared to setter plates having a flatness of 700 µm.

FIG. 10 further demonstrates that the use of additional weight (e.g., double weight as used in Sample Set 1) does not significantly reduce warp. For example, for each of Sample Set 1, Sample Set 2, and Sample Set 3, the first five samples of each set were performed using a setter with a flatness of 100 µm, while the last 5 samples of each set were performed using a setter with a flatness of 700 µm. The flatter setter reduced the warp to approximately the same amount independent of the weight, as shown by comparing Sample Set 1, which had double weight, to Sample Sets 2 and 3, each of which have equalized weight.

In various embodiments, the setter plate 104 has a maximum flatness of less than or equal to about 100 µm, less than or equal to about 75 µm, less than or equal to about 50 µm, less than or equal to about 45 µm, less than or equal to about 40 µm, less than or equal to about 35 µm, less than or equal to about 30 µm, or even less than or equal to about 25 µm.

Figure 11:
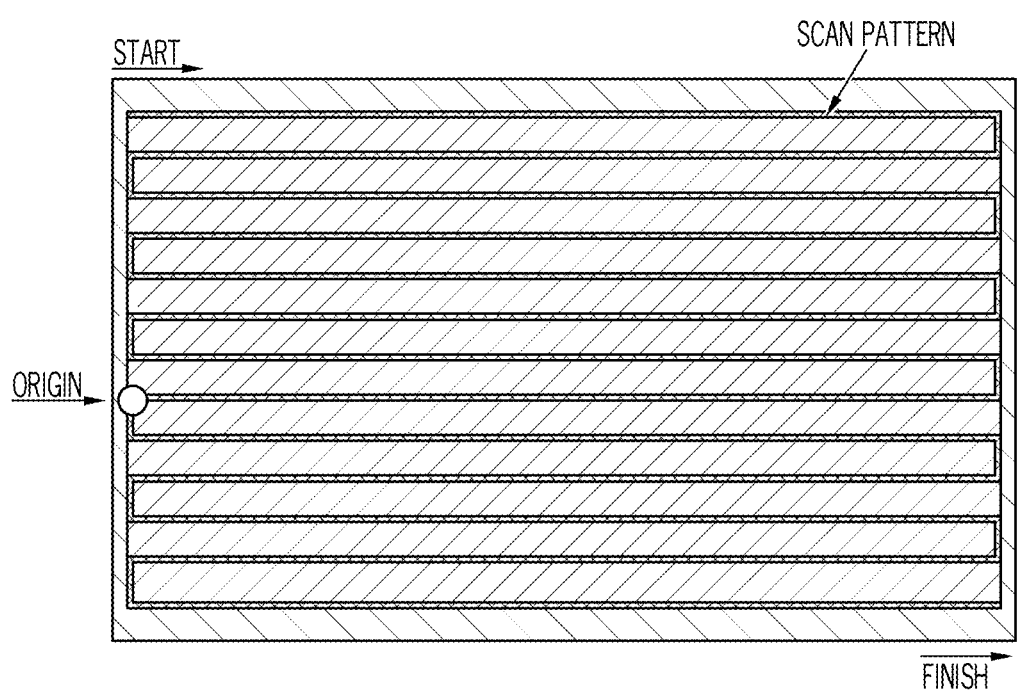
FIG. 11 is a schematic illustrating the scan pattern for the CMM (coordinate measuring machine) measurement of the flatness of setter plates in accordance with one or more embodiments described herein.

Flatness can be measured using a CMM and touch and/or non-touch probes. In various embodiments, the measurement density is 1 point/mm throughout the sweep trajectory and the measurement region is about 10 mm inbound from a side of the setter plate. The origin of alignment is at the center of the shorter edge, as shown in FIG. 11. To locate the origin, the CMM finds the corners of the setter plate 104 and calculates the distance between the two corners. The origin is the distance divided by two. To determine the region of inspection, the probe is moved 10 mm horizontally inbound from edge of the setter plate at the origin. Then, the probe is moved upwards about 325 mm to the start point. The sweep begins at that point. Spacing between each line is about 15 mm, and the setter plate is scanned in a serpentine pattern, as shown in FIG. 11. Flatness is evaluated by the CMM using the minimum zone method.

The thickness t of the setter plate 104 (shown in FIG. 1) is selected, at least in part, to balance the thermal effects of the setter plate 104 on the glass stack 106 with inducement of warp. In particular, the thickness should be minimized for heat transfer and uniformity, yet maximized for strength and warp resistance. Accordingly, in various embodiments, the setter plate 104 has a thickness t of from about 6.5 mm to about 10 mm, or from about 7 mm to about 9.5 mm, or from about 7.5 mm to about 9 mm, or from about 7.9 mm to about 8.2 mm and all ranges and subranges therebetween.

Figure 12:
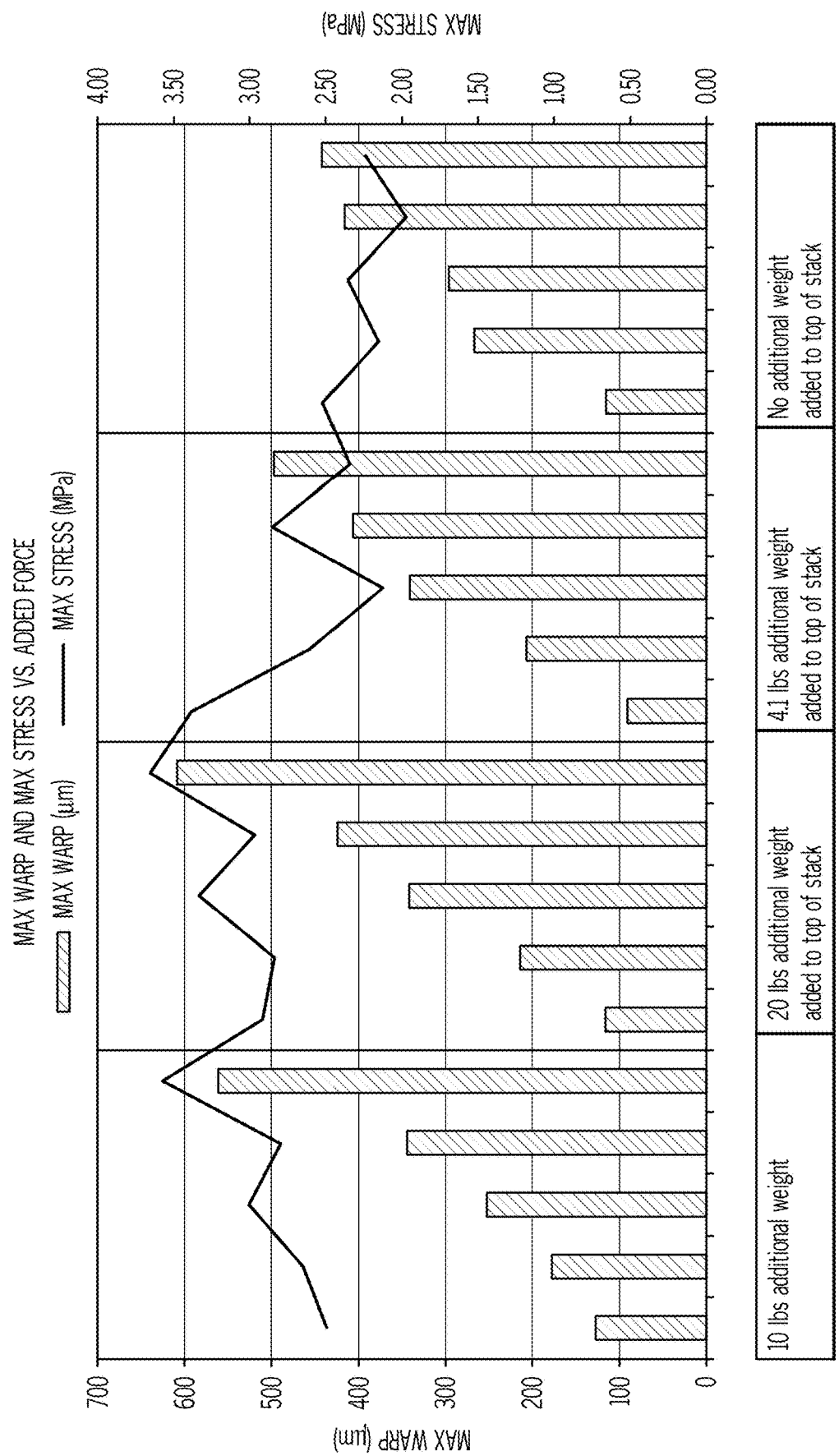
FIG. 12 is a graph illustrating the maximum warp (μm; left y-axis) as bars through the thickness of the glass stack for various amounts of applied force and the maximum stress (MPa; right y-axis) as a line graph for the various amounts of applied force in accordance with one or more embodiments described herein.

The density of the material used to form the setter plate 104 and the thickness of the setter plate 104 may further be selected based on the applied force on the glass stack 106. FIG. 12 illustrates how additional force on the glass stack can contribute to increased stress in the glass ceramic article. In particular, as shown in FIG. 12, the addition of weight not only did not improve the warp (e.g., decrease the maximum warp), but it further increased the maximum stress at various points within the glass stack. Without being bound by theory, it is believed that the addition of additional force constrains the glass sheets during the ceramming process when shrinkage occurs. Accordingly, it is believed that the ability of the material to move freely during the ceramming process decreases warp in the glass ceramic article. In various embodiments, setter plates 104 made from reaction bonded silicon carbide may provide good heat transfer while maintaining low applied force, thereby resulting in low warp and stress in the glass ceramic article.

Glass Sheets

The glass sheets 108 may be made from any glass composition that is suitable for forming glass ceramic articles, although it should be understood that the glass composition of the glass sheets 108 can impact the mechanical and optical properties of the glass ceramic article. In various embodiments, the glass composition is selected such that the resultant glass ceramic article has a petalite crystalline phase and a lithium silicate crystalline phase and wherein the petalite crystalline phase and the lithium silicate crystalline phase have higher weight percentages than other crystalline phases present in the glass ceramic article.

By way of example and not limitation, in various embodiments, the glass sheets 108 may be formed from a glass composition including from about 55 wt % to about 80 wt % $SiO_2$, from about 2 wt % to about 20 wt % $Al_2O_3$, from about 5 wt % to about 20 wt % $Li_2O$, from about 0 wt % to about 10 wt % $B_2O_3$, from about 0 wt % to about 5 wt % $Na_2O$, from about 0 wt % to about 10 wt % ZnO, from about 0.5 wt % to about 6 wt % $P_2O_5$, and from about 0.2 wt % to about 15 wt % $ZrO_2$.

$SiO_2$, an oxide involved in the formation of glass, can function to stabilize the networking structure of glasses and glass ceramics. In various glass compositions, the concentration of $SiO_2$ should be sufficiently high in order to form petalite crystal phase when the glass sheet is heat treated to convert to a glass ceramic. The amount of $SiO_2$ may be limited to control the melting temperature of the glass, as the melting temperature of pure $SiO_2$ or high-$SiO_2$ glasses is undesirably high. In some embodiments, the glass or glass ceramic composition comprises from about 55 wt % to about 80 wt % $SiO_2$. In some embodiments, the glass or glass ceramic composition comprises from about 69 wt % to about 80 wt % $SiO_2$. In some embodiments, the glass or glass ceramic composition can comprise from about 55 wt % to about 80 wt %, about 55 wt % to about 77 wt %, about 55 wt % to about 75 wt %, about 55 wt % to about 73 wt %, about 60 wt % to about 80 wt %, about 60 wt % to about 77 wt %, about 60 wt % to about 75 wt %, about 60 wt % to about 73 wt %, about 69 wt % to about 80 wt %, about 69 wt % to about 77 wt %, about 69 wt % to about 75 wt %, about 69 wt % to about 73 wt %, about 70 wt % to about 80 wt %, about 70 wt % to about 77 wt %, about 70 wt % to about 75 wt %, about 70 wt % to about 73 wt %, about 73 wt % to about 80 wt %, about 73 wt % to about 77 wt %, about 73 wt % to about 75 wt %, about 75 wt % to about 80 wt %, about 75 wt % to about 77 wt %, or about 77 wt % to about 80 wt % $SiO_2$.

$Al_2O_3$ may also provide stabilization to the network and also provides improved mechanical properties and chemical durability. If the amount of $Al_2O_3$ is too high, however, the fraction of lithium silicate crystals may be decreased, possibly to the extent that an interlocking structure cannot be formed. The amount of $Al_2O_3$ can be tailored to control viscosity. Further, if the amount of $Al_2O_3$ is too high, the viscosity of the melt is also generally increased. In some embodiments, the glass or glass ceramic composition can comprise from about 2 wt % to about 20 wt % $Al_2O_3$. In some embodiments, the glass or glass ceramic composition can comprise from about 6 wt % to about 9 wt % $Al_2O_3$. In some embodiments, the glass or glass ceramic composition can comprise from about 2 wt % to about 20 wt %, about 2 wt % to about 18 wt %, about 2 wt % to about 15 wt %, about 2 wt % to about 12 wt %, about 2 wt % to about 10 wt %, about 2 wt % to about 9 wt %, about 2 wt % to about 8 wt %, about 2 wt % to about 5 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 9 wt %, about 5 wt % to about 8 wt %, 6 wt % to about 20 wt %, about 6 wt % to about 18 wt %, about 6 wt % to about 15 wt %, about 6 wt % to about 12 wt %, about 6 wt % to about 10 wt %, about 6 wt % to about 9 wt %, 8 wt % to about 20 wt %, about 8 wt % to about 18 wt %, about 8 wt % to about 15 wt %, about 8 wt % to about 12 wt %, about 8 wt % to about 10 wt %, 10 wt % to about 20 wt %, about 10 wt % to about 18 wt %, about 10 wt % to about 15 wt %, about 10 wt % to about 12 wt %, about 12 wt % to about 20 wt %, about 12 wt % to about 18 wt %, or about 12 wt % to about 15 wt % $Al_2O_3$.

In the glass and glass ceramics herein, $Li_2O$ aids in forming both petalite and lithium silicate crystal phases. In fact, to obtain petalite and lithium silicate as the predominant crystal phases, it is desirable to have at least about 7 wt % $Li_2O$ in the composition. Additionally, it has been found that once $Li_2O$ gets too high (greater than about 15 wt %), the composition becomes very fluid. Accordingly, in some embodiments, the glass or glass ceramic composition can comprise from about 5 wt % to about 20 wt % $Li_2O$. In other embodiments, the glass or glass ceramic composition can comprise from about 10 wt % to about 14 wt % $Li_2O$. In some embodiments, the glass or glass ceramic composition can comprise from about 5 wt % to about 20 wt %, about 5 wt % to about 18 wt %, about 5 wt % to about 16 wt %, about 5 wt % to about 14 wt %, about 5 wt % to about 12 wt %, about 5 wt % to about 10 wt %, about 5 wt % to about 8 wt %, about 7 wt % to about 20 wt %, about 7 wt % to about 18 wt %, about 7 wt % to about 16 wt %, about 7 wt % to about 14 wt %, about 7 wt % to about 12 wt %, about 7 wt % to about 10 wt %, about 10 wt % to about 20 wt %, about 10 wt % to about 18 wt %, about 10 wt % to about 16 wt %, about 10 wt % to about 14 wt %, about 10 wt % to about 12 wt %, about 12 wt % to about 20 wt %, about 12 wt % to about 18 wt %, about 12 wt % to about 16 wt %, about 12 wt % to about 14 wt %, about 14 wt % to about 20 wt %, about 14 wt % to about 18 wt %, about 14 wt % to about 16 wt %, about 16 wt % to about 20 wt %, about 16 wt % to about 18 wt %, or about 18 wt % to about 20 wt % $Li_2O$.

As noted above, $Li_2O$ is generally useful for forming various glass ceramics, but the other alkali oxides tend to decrease glass ceramic formation and form an aluminosilicate residual glass in the glass ceramic. It has been found that more than about 5 wt % $Na_2O$ or $K_2O$, or combinations thereof, leads to an undesirable amount of residual glass, which can lead to deformation during crystallization and undesirable microstructures from a mechanical property perspective. The composition of the residual glass may be tailored to control viscosity during crystallization, minimizing deformation or undesirable thermal expansion, or control microstructure properties. Therefore, in general, the glass sheets may be made from glass compositions having low amounts of non-lithium alkali oxides. In some embodiments, the glass or glass ceramic composition can comprise from about 0 wt % to about 5 wt % $R_2O$, wherein R is one or more of the alkali cations Na and K. In some embodiments, the glass or glass ceramic composition can comprise from about 1 wt % to about 3 wt % $R_2O$, wherein R is one or more of the alkali cations Na and K. In some embodiments, the glass or glass ceramic composition can comprise from 0 wt % to about 5 wt %, 0 wt % to about 4 wt %, 0 wt % to about 3 wt %, 0 wt % to about 2 wt %, 0 wt % to about 1 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt % $Na_2O$, $K_2O$, or combinations thereof.

The glass and glass ceramic compositions can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body. However, if the concentration of $P_2O_5$ is too high, the devitrification, upon cooling during the formation of the glass sheets, can be difficult to control. Embodiments can include from >0 wt % to about 6 wt % $P_2O_5$. Other embodiments can include from about 2 wt % to about 4 wt % $P_2O_5$. Still other embodiments can include from about 1.5 wt % to about 2.5 wt % $P_2O_5$. In some embodiments, the glass or glass ceramic composition can include from 0 wt % to about 6 wt %, 0 wt % to about 5.5 wt %, 0 wt % to 5 wt %, 0 wt % to about 4.5 wt %, 0 wt % to about 4 wt %, 0 wt % to about 3.5 wt %, 0 wt % to about 3 wt %, 0 wt % to about 2.5 wt %, 0 wt % to about 2 wt %, 0 wt % to about 1.5 wt %, 0 wt % to about 1 wt %, >0 wt % to about 6 wt %, >0 wt % to about 5.5 wt %, >0 wt % to 5 wt %, >0 wt % to about 4.5 wt %, >0 wt % to about 4 wt %, >0 wt % to about 3.5 wt %, >0 wt % to about 3 wt %, >0 wt % to about >2.5 wt %, 0 wt % to about 2 wt %, >0 wt % to about 1.5 wt %, >0 wt % to about 1 wt %, about 0.5 wt % to about 6 wt %, about 0.5 wt % to about 5.5 wt %, about 0.5 wt % to 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to 5 wt %, about 3.5 wt % to about 4.5 wt %, about 3.5 wt % to about 4 wt %, about 4 wt % to about 6 wt %, about 4 wt % to about 5.5 wt %, about 4 wt % to 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, or about 5.5 wt % to about 6 wt % $P_2O_5$.

In various glass and glass ceramic compositions, it is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass ceramic. In some embodiments, the glass or glass ceramic composition can comprise from about 0.2 wt % to about 15 wt % $ZrO_2$. In some embodiments, the glass or glass ceramic composition can include from about 2 wt % to about 4 wt % $ZrO_2$. In some embodiments, the glass or glass ceramic composition can comprise from about 0.2 wt % to about 15 wt %, about 0.2 wt % to about 12 wt %, about 0.2 wt % to about 10 wt %, about 0.2 wt % to about 8 wt %, about 0.2 wt % to about 6 wt %, about 0.2 wt % to about 4 wt %, about 0.5 wt % to about 15 wt %, about 0.5 wt % to about 12 wt %, about 0.5 wt % to about 10 wt %, about 0.5 wt % to about 8 wt %, about 0.5 wt % to about 6 wt %, about 0.5 wt % to about 4 wt %, about 1 wt % to about 15 wt %, about 1 wt % to about 12 wt %, about 1 wt % to about 10 wt %, about 1 wt % to about 8 wt %, about 1 wt % to about 6 wt %, about 1 wt % to about 4 wt %, about 2 wt % to about 15 wt %, about 2 wt % to about 12 wt %, about 2 wt % to about 10 wt %, about 2 wt % to about 8 wt %, about 2 wt % to about 6 wt %, about 2 wt % to about 4 wt %, about 3 wt % to about 15 wt %, about 3 wt % to about 12 wt %, about 3 wt % to about 10 wt %, about 3 wt % to about 8 wt %, about 3 wt % to about 6 wt %, about 3 wt % to about 4 wt %, about 4 wt % to about 15 wt %, about 4 wt % to about 12 wt %, about 4 wt % to about 10 wt %, about 4 wt % to about 8 wt %, about 4 wt % to about 6 wt %, about 8 wt % to about 15 wt %, about 8 wt % to about 12 wt %, about 8 wt % to about 10 wt %, about 10 wt % to about 15 wt %, about 10 wt % to about 12 wt %, or about 12 wt % to about 15 wt % $ZrO_2$.

$B_2O_3$ is conducive to providing a glass sheet with a low melting temperature. Furthermore, the addition of $B_2O_3$ in the glass sheet and thus the glass ceramic article helps achieve an interlocking crystal microstructure and can also improve the damage resistance of the glass ceramic article. When boron in the residual glass is not charge balanced by alkali oxides or divalent cation oxides, it will be in trigonal-coordination state (or three-coordinated boron), which opens up the structure of the glass. The network around these three coordinated boron is not as rigid as tetrahedrally coordinated (or four-coordinated) boron. Without being bound by theory, it is believed that glass sheets and glass ceramics that include three-coordinated boron can tolerate some degree of deformation before crack formation. By tolerating some deformation, the Vickers indentation crack initiation values are increased. Fracture toughness of the glass sheets and glass ceramics that include three-coordinated boron may also be increased. Without being bound by theory, it is believed that the presence of boron in the residual glass of the glass ceramic (and glass sheet) lowers the viscosity of the residual glass (or glass sheet), which facilitates the growth of lithium silicate crystals, especially large crystals having a high aspect ratio. A greater amount of three-coordinated boron (in relation to four-coordinated boron) is believed to result in glass ceramics that exhibit a greater Vickers indentation crack imitation load. In some embodiments, the amount of three-coordinated boron (as a percent of total $B_2O_3$) may be about 40% or greater, 50% or greater, 75% or greater, 85% or greater, or even 95% or greater. The amount of boron in general should be controlled to maintain chemical durability and mechanical strength of the cerammed bulk glass ceramic.

In one or more embodiments, the glass or glass ceramic composition comprises from 0 wt % to about 10 wt % or from 0 wt % to about 2 wt % $B_2O_3$. In some embodiments, the glass or glass ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, >0 wt % to about 10 wt %, >0 wt % to about 9 wt %, >0 wt % to about 8 wt %, >0 wt % to about 7 wt %, >0 wt % to about 6 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 2 wt %, about 2 wt % to about 10 wt %, about 2 wt % to about 8 wt %, about 2 wt % to about 6 wt %, about 2 wt % to about 4 wt %, about 3 wt % to about 10 wt %, about 3 wt % to about 8 wt %, about 3 wt % to about 6 wt %, about 3 wt % to about 4 wt %, about 4 wt % to about 5 wt %, about 5 wt % to about 8 wt %, about 5 wt % to about 7.5 wt %, about 5 wt % to about 6 wt %, or about 5 wt % to about 5.5 wt % $B_2O_3$.

MgO can enter petalite crystals in a partial solid solution. In one or more embodiments, the glass or glass ceramic composition can comprise from 0 wt % to about 8 wt % MgO. In some embodiments, the glass or glass ceramic composition can comprise from 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 8 wt %, about 4 wt % to about 7 wt %, about 4 wt % to about 6 wt %, about 4 wt % to about 5 wt %, about 5 wt % to about 8 wt %, about 5 wt % to about 7 wt %, about 5 wt % to about 6 wt %, about 6 wt % to about 8 wt %, about 6 wt % to about 7 wt %, or about 7 wt % to about 8 wt % MgO.

ZnO can enter petalite crystals in a partial solid solution. In one or more embodiments, the glass or glass ceramic composition can comprise from 0 wt % to about 10 wt % ZnO. In some embodiments, the glass or glass ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, or about 9 wt % to about 10 wt % ZnO.

In various embodiments, the glass or glass ceramic composition may further include one or more constituents, such as, by way of example and not limitation, $TiO_2$, $CeO_2$, and $SnO_2$. Additionally or alternatively, antimicrobial components may be added to the glass or glass ceramic composition. Antimicrobial components that may be added to the glass or glass ceramic may include, but are not limited to, Ag, AgO, Cu, CuO, $Cu_2O$, and the like. In some embodiments, the glass or glass ceramic composition may further include a chemical fining agent. Such fining agents include, but are not limited to, $SnO_2$, $As_2O_3$, $Sb_2O_3$, F, Cl, and Br. Additional details on glass and/or glass ceramic compositions suitable for use in various embodiments may be found in, for example, U.S. Patent Application Publication No. 2016/0102010 entitled "High Strength Glass-Ceramics Having Petalite and Lithium Silicate Structures," filed Oct. 8, 2015, which is incorporated by reference herein in its entirety.

In various embodiments, the glass compositions can be manufactured into sheets via processes, including but not limited to, slot draw, float, rolling, and other sheet-forming processes known to those skilled in the art.

Figure 13:
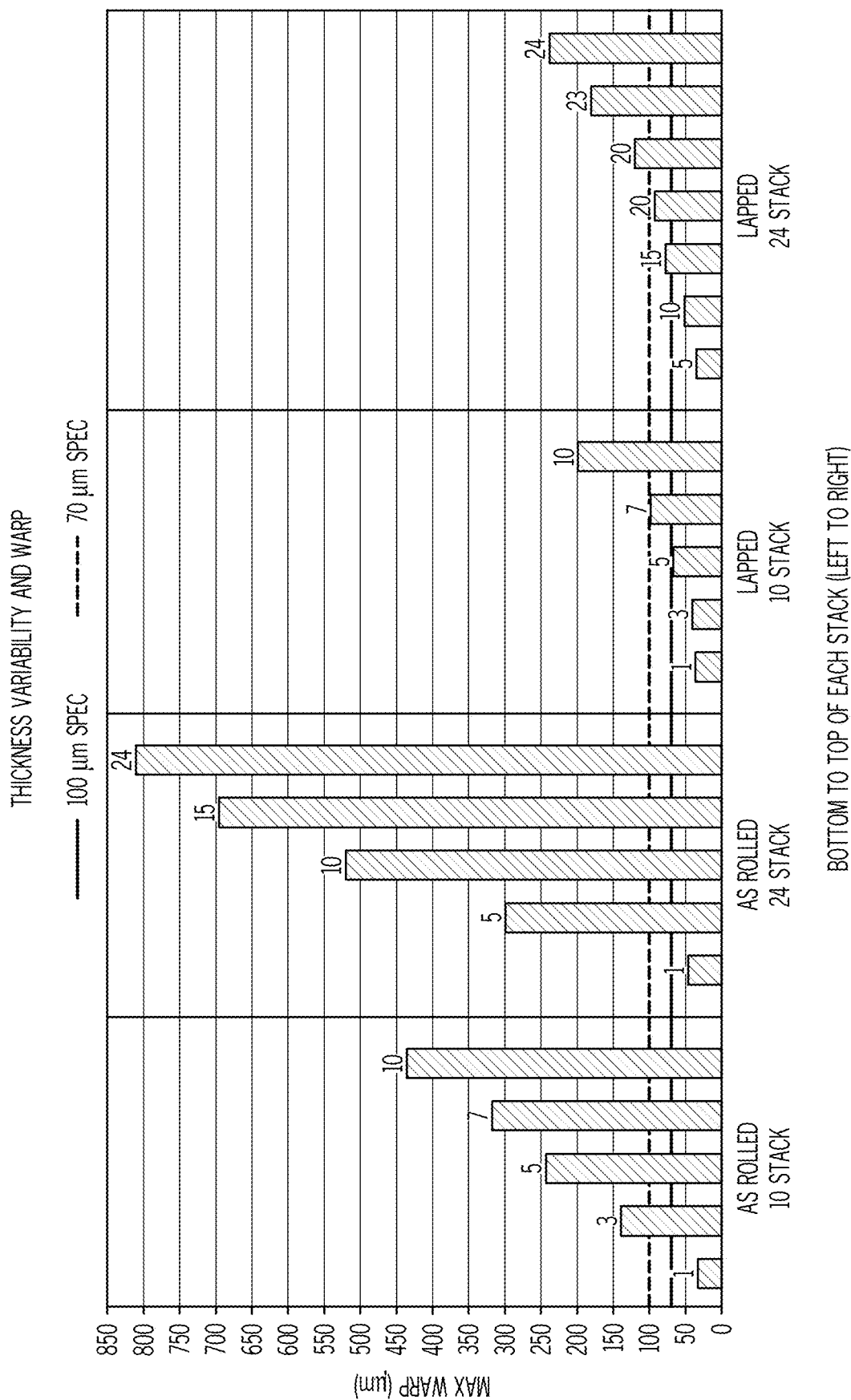
FIG. 13 is a graph illustrating the maximum warp (μm; y-axis) through the thickness of glass stacks having various thickness variability in accordance with one or more embodiments described herein.
Figure 14:
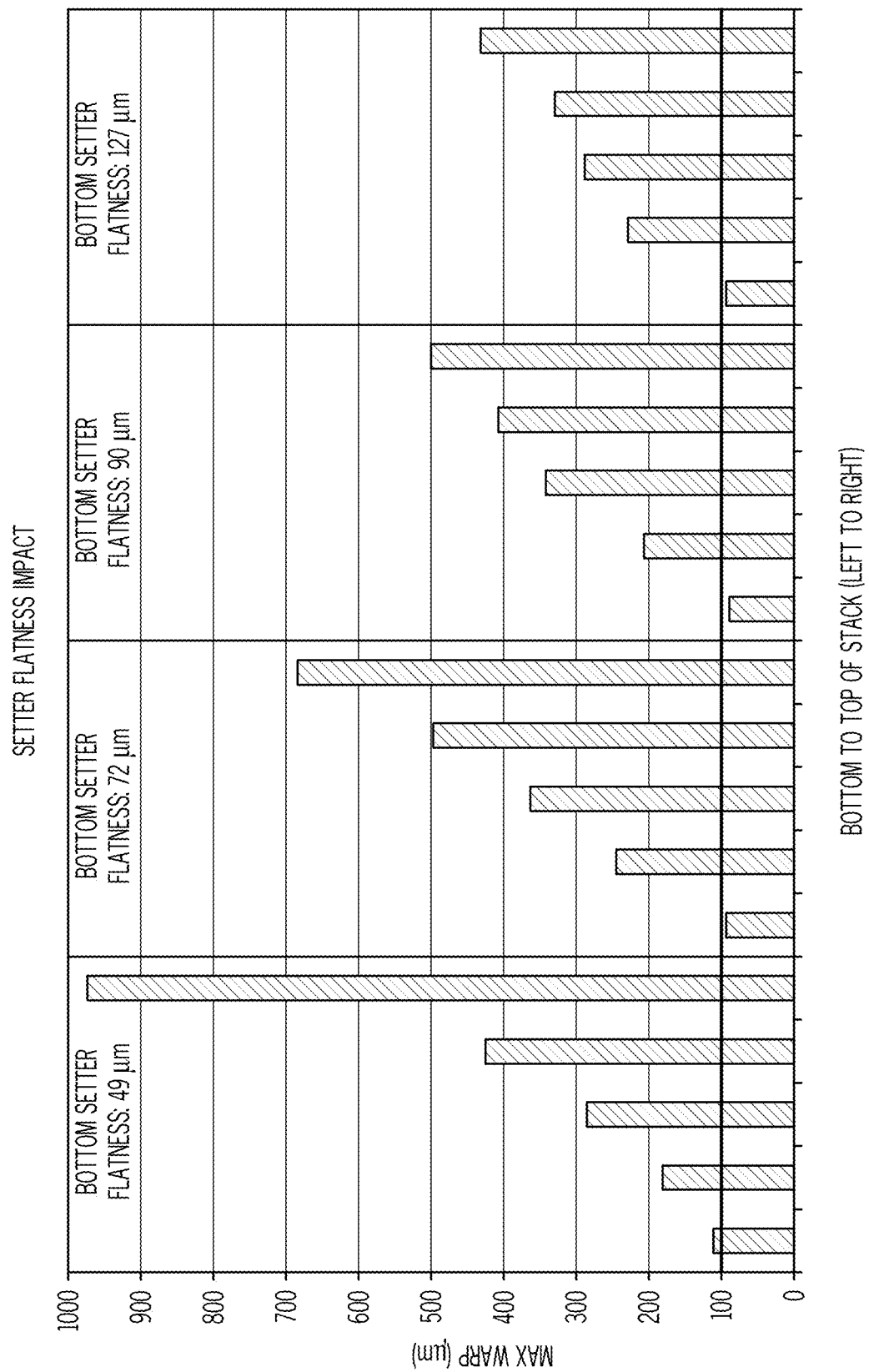
FIG. 14 is a graph illustrating the maximum warp (μm; y-axis) through the thickness of the glass stack for various setter plate flatnesses in accordance with one or more embodiments described herein.

According to various embodiments herein, the thickness uniformity of the glass sheets 108 is controlled to decrease the warp of the glass ceramic article. In FIG. 13, the maximum warp for glass stacks of 10 glass sheets and 24 glass sheets for both as-rolled glass and lapped glass is shown. As shown in FIG. 13, for glass stacks including as-rolled glass sheets with a maximum thickness variation of 64 µm, the maximum warp was significantly increased as compared to glass stacks including lapped glass sheets with a maximum thickness variation of 21 µm. Additionally, as demonstrated by the data in FIG. 14, the flatness of the setter plate 104 (as described above) has an impact that is limited by the variability of the thickness of the glass sheets. In particular, FIG. 14 shows that for a 10 glass sheet stack configuration of as-rolled glass, a 78 µm reduction in the flatness of the setter plate has a limited impact on the warp of the glass ceramic article. Accordingly, following sheet formation, in various embodiments, the glass sheets may be machined or otherwise processed to reduce the thickness variability of the glass sheets.

Figure 15A:
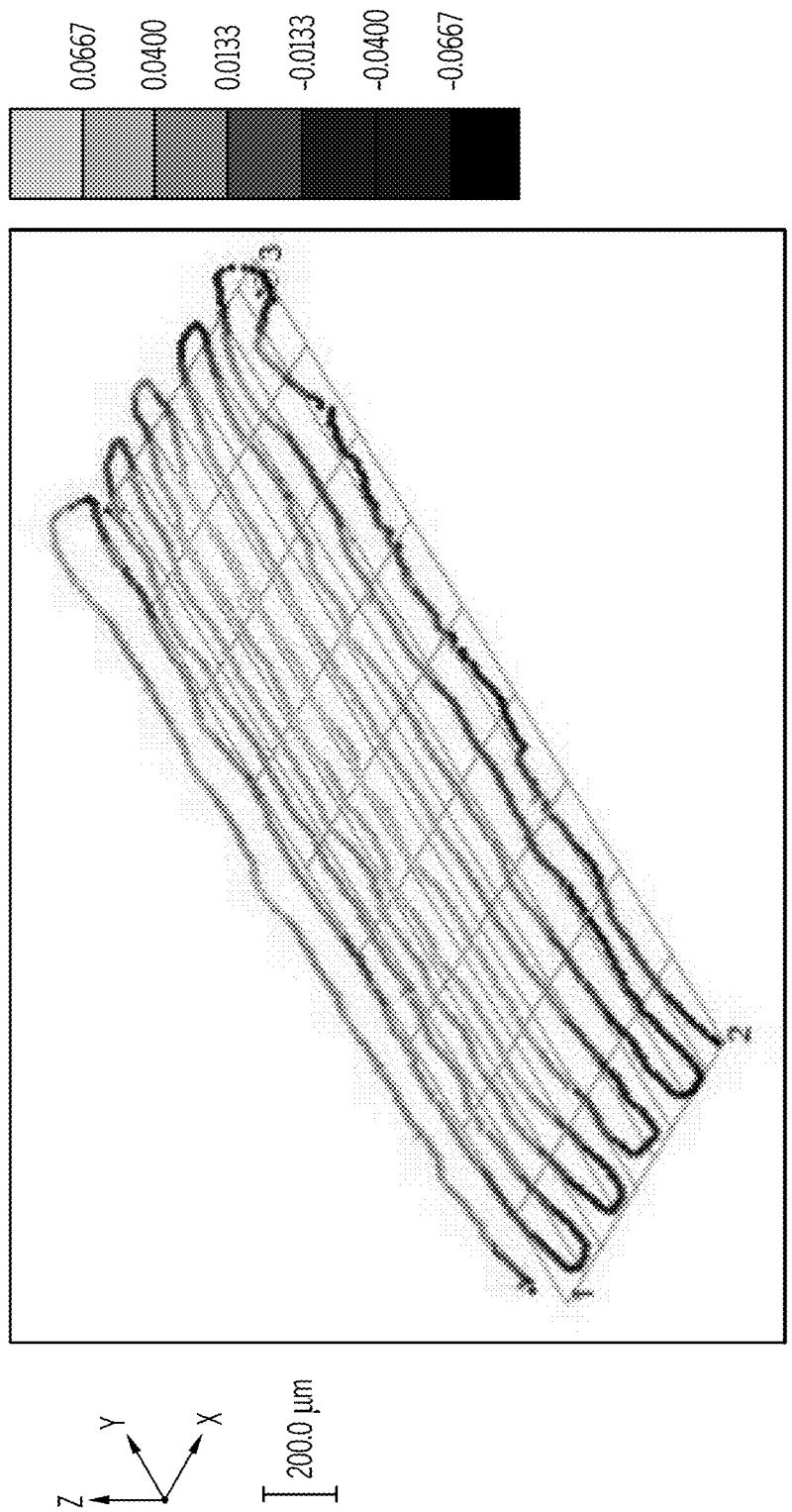
FIG. 15A is a graphical representation of the warp of a 26 5 mm glass strip with the edge bead removed in accordance with one or more embodiments described herein.
Figure 15B:
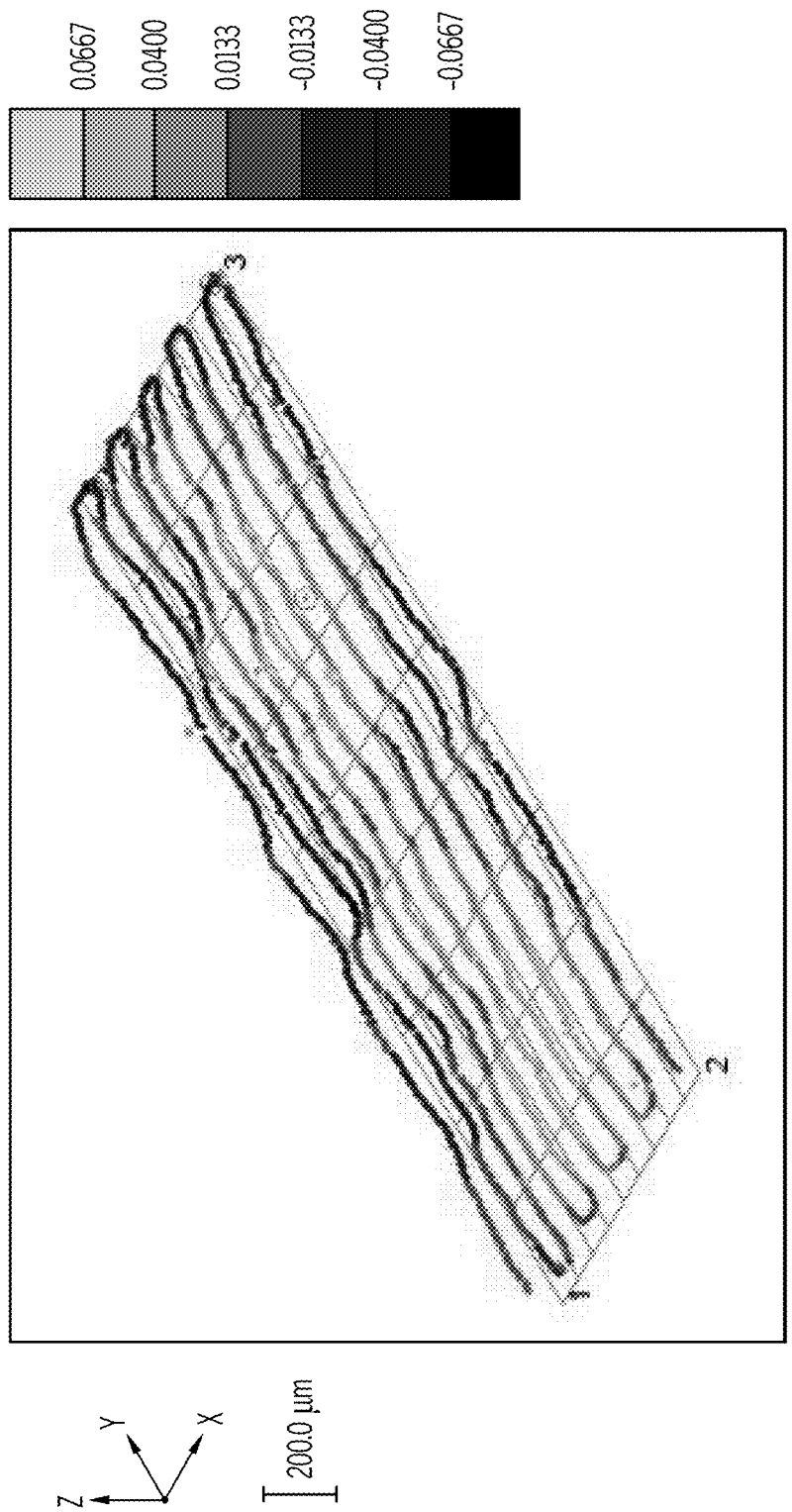
FIG. 15B is a graphical representation of the warp of a 26 5 mm glass strip with the edge bead remaining in accordance with one or more embodiments described herein.
Figure 16:
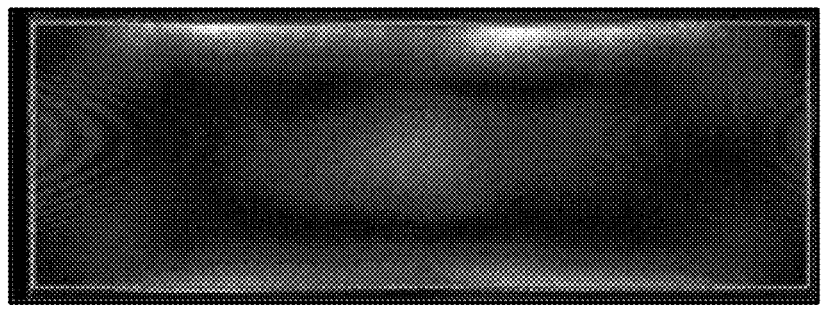
FIG. 16 is a graphical representation of the stress of a glass ceramic article with the edge bead remaining (top) and with the edge bead removed (bottom) in accordance with one or more embodiments described herein.
Figure 16:
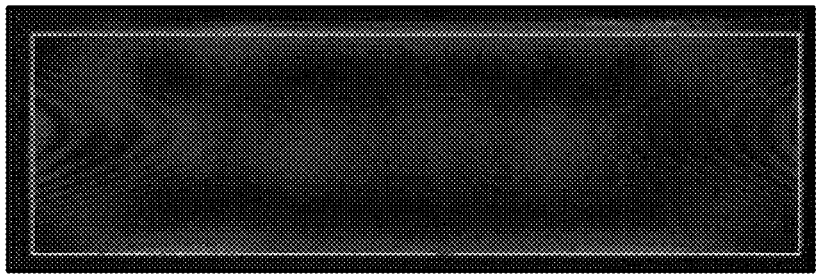
Figure 16:
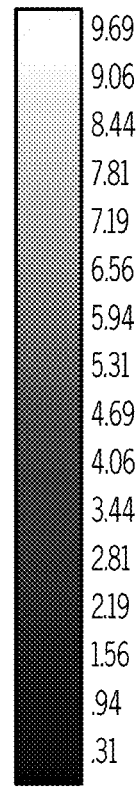

In various embodiments, the edge bead may be removed from glass sheets to decrease the amount of warp observed in the glass ceramic article. It is believed that the edge beads have higher thickness non-uniformity and therefore contribute to warp during the ceramming process. In particular, in embodiments in which a single sheet of glass is subjected to the ceramming process (e.g., not incorporated into a glass stack), the removal of the edge bead can reduce warp in the glass sheet. As shown in FIG. 15A, the removal of the edge bead (approximately 10 mm on each side of the glass sheet) decreases the maximum flatness by 56 µm as compared to the glass sheet without removal of the edge bead (FIG. 15B). Additionally, as shown in FIG. 16, the stress in the glass ceramic article is reduced when the bead is removed (bottom) as compared to when the glass ceramic article is cerammed including the bead (top). However, unexpectedly, removal of the edge bead from glass sheets incorporated into a glass stack during the ceramming process results in increased warp in embodiments in which a parting agent layer is not also incorporated into the glass stack. Without being bound by theory, it is believed that the increase in surface area contact resulting from the removal of the edge beads of adjacent glass sheets provides additional area for sticking to occur. Accordingly, in embodiments in which the edge bead is removed and the glass sheet is to be incorporated into a glass stack, a parting agent layer is incorporated.

Figure 17:
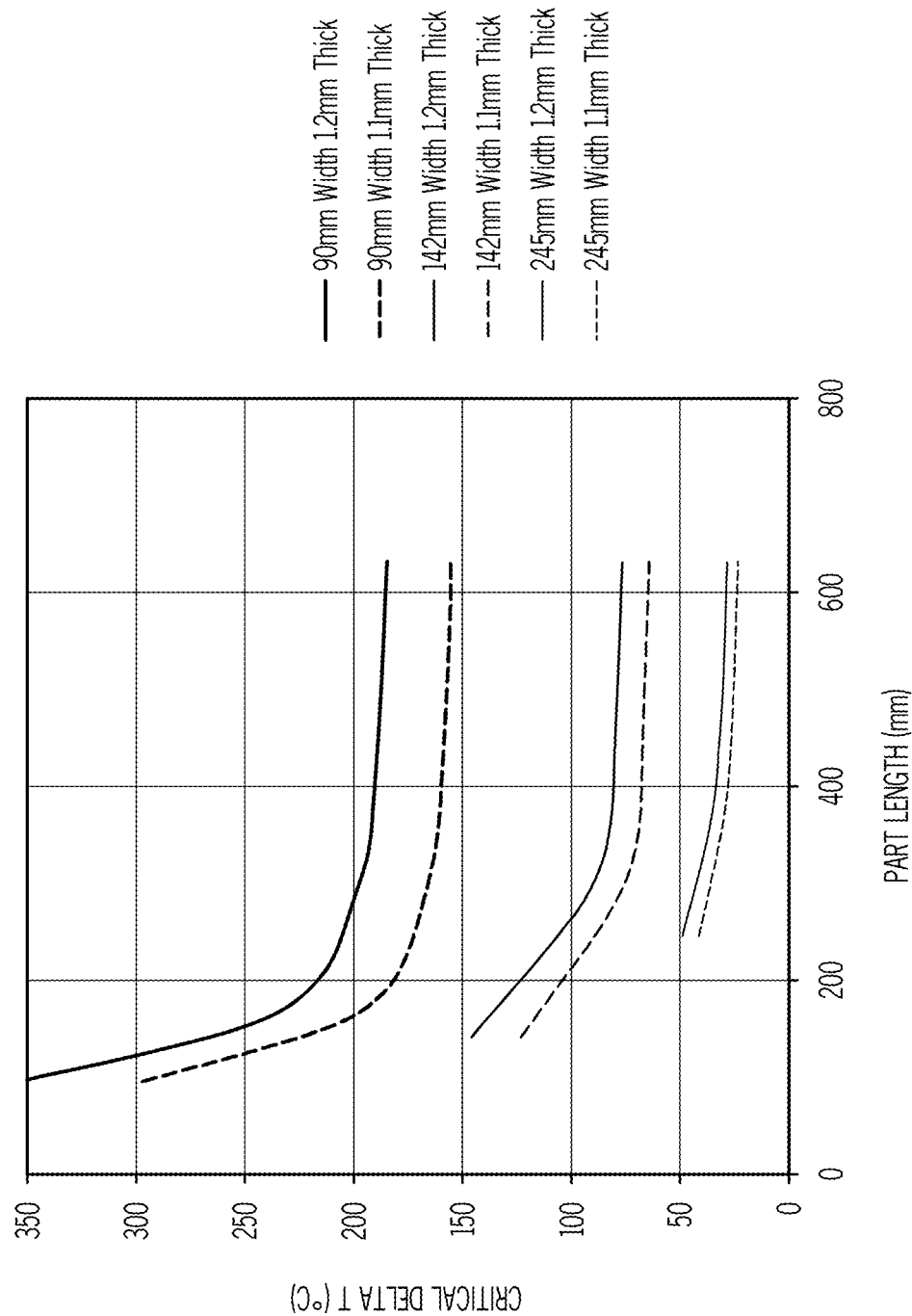
FIG. 17 is a graph plotting the critical delta T (° C.; y-axis) as a function of part length (mm; x-axis) for glass ceramic parts of various lengths and widths in accordance with one or more embodiments described herein.

In various embodiments, part size is also taken into account to control warp and stress in the glass ceramic article. As shown in FIG. 17, the critical $\Delta T$ decreases with part size. In particular, the critical $\Delta T$ is the $\Delta T$ at which stress and warp may be induced for various part lengths and widths. Accordingly, for larger parts, a larger $\Delta T$ may be acceptable without inducing warp or buckling into the final glass ceramic article.

Accordingly, in various embodiments, the thickness variation of the glass sheets can be controlled individually and throughout the glass stack, such as by edge bead removal and lapping, to reduce the warp and stress imparted to the glass ceramic article.

Parting Agent Layer

As described hereinabove, in various embodiments, a parting agent layer 110 is deposited between adjacent glass sheets 108 in the glass stack 106. In some embodiments, a parting agent layer 110 may also be deposited between the setter plate 104 and the glass stack 106. For example, a parting agent layer 110 may be coated onto the setter plate 104, or may be deposited on the surface of the glass sheet 108 at the top and/or bottom of the glass stack 106.

In various embodiments, the parting agent layer 110 is formed from a parting agent composition which comprises an aqueous dispersion including boron nitride and a colloidal inorganic binding agent. In embodiments, the parting agent composition is substantially free of volatile organic solvents. Accordingly, processes employing the parting agent composition may generate less hazardous waste than conventional processes using alcohol-based products.

According to various embodiments, the parting agent composition includes boron nitride as a lubricant. The use of boron nitride enables the parting agent composition to be used in high temperatures (e.g., >500° C.) applications, which may not be possible with alternative lubricants. Additionally, boron nitride may be particularly well-suited for use as a lubricant in various embodiments because it maintains its lubrication properties throughout the ceramming process. In the parting agent composition of various embodiments, the boron nitride is present in the form of agglomerated particles having an average particle size of from about 2 μm to about 4 μm. Although the particle size may vary depending on the particular embodiment employed, the particle size generally should not exceed about 4 μm to reduce surface roughness and enable the formation of ultra-thin (e.g., 2 gsm dry weight) coating layers.

As described above, the parting agent composition further includes a colloidal inorganic binding agent. The colloidal inorganic binding agent may include, by way of example and not limitation, aluminum oxide (AlOx). Other colloidal inorganic binding agents may be used, provided that they do not fully decompose during the heat treatment (e.g., ceramming) process.

In some embodiments, the parting agent composition may optionally include one or more dispersants or other additives. For example, antimicrobial additives may be employed. Suitable dispersants include nitric acid or other dispersants known and used in the art. However, in other embodiments, the parting agent composition may be substantially free of additional components in order to reduce the likelihood of reaction between the parting agent layer 110 and the glass sheets 108 and/or the setter plate 104.

The parting agent composition has a specific gravity of from about 1.0 to about 1.2 as measured using a syringe to pull off a predetermined volume of the parting agent composition and weighing that volume. Specifically, to measure the specific gravity, a 20 mL syringe is used to pull about 10 mL of the parting agent composition into the syringe and pushed back out to evacuate bubbles. The syringe is then wiped clean, placed on a scale, and the scale is zeroed out. Then, exactly 20 mL of the parting agent composition is pulled into the syringe, the syringe is wiped clean, and placed on the scale to get the weight in grams in the syringe. The weight is then divided by 20 to get the specific gravity.

Additionally or alternatively, in various embodiments, the parting agent composition has a viscosity of from about 120 centipoise (cP) to about 160 cP as measured on a Brookfield DV2TLV Viscometer, four spindle and all ranges and subranges therebetween. Although the viscosity may vary depending on the particular embodiment, a viscosity greater than 160 cP or less than 120 cP may adversely impact the application of the composition to the glass sheets, and may result in an uneven parting agent layer.

In various embodiments, the parting agent composition has a pH of from about 3 to about 5 and all ranges and subranges therebetween. In particular, when the parting agent composition has a pH in this range, the composition is compatible with application to the surface of the glass sheet without concern for pitting or etching the surface. Suitable commercially available parting agents include those available from Zyp Coatings (Tennessee).

As described above, the parting agent composition may be applied to one or more surfaces of the glass sheets 108 and/or the setter plates 104 to form a parting agent layer 110. In various embodiments, the parting agent composition is applied via a spray dispersion technique, such as rotary atomization and/or air assisted spray dispersion. Without being bound by theory, it is believed that other application techniques, including but not limited to roller coating, dipping, and ultrasonic powder application, are unable to achieve the desired layer thickness and uniformity desired by various embodiments. Accordingly, in various embodiments, the parting agent composition is dried to form a parting agent layer 110 having a dry coat weight of from about 2 gsm to about 6 gsm and all ranges and subranges therebetween. Although the thickness of the parting agent layer 110 can vary depending on the particular embodiment, it is generally expected that dry coat weights of less than about 2 gsm may have an increased risk of sticking. Additionally, in various embodiments, the parting agent layer 110 has a substantially uniform distribution on the surface of the glass sheet 108 and/or the setter plate 104.

In embodiments described herein, coating uniformity was characterized by percent haze and percent transmittance using a BYK Haze-Gard Plus instrument from the Paul N. Gardner Company, Inc. in accordance with ASTM D 1003 (for transmission) and ASTM D 1044 (for haze). The Haze-Gard Plus is capable of directly determining total transmittance, haze and clarity. The instrument utilizes an Illuminant C light source representing average day light with a correlated color temperature of 6774 K. In various embodiments, the cerammed glass sheet 100 having a parting agent layer 110 on one surface thereof has a percent transmission of from about 76% to about 83% as measured in accordance with ASTM D1003 and a percent haze of from about 25% to about 38% as measured in accordance with ASTM D1044.

Figure 18:
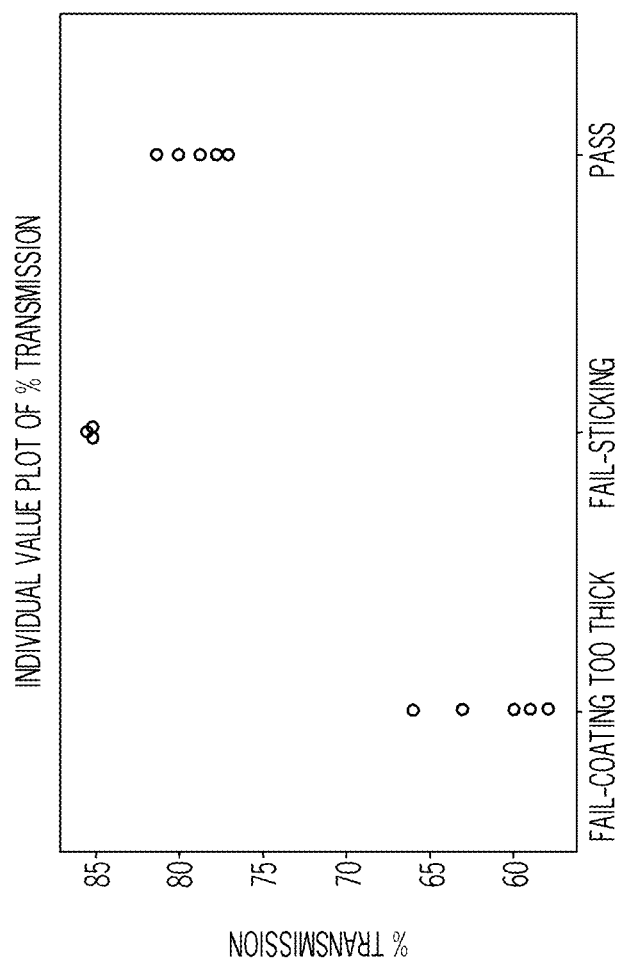
FIG. 18 is a graph of the % transmission (y-axis) for various glass stacks in accordance with one or more embodiments described herein.

FIG. 18 is a plot of the percent transmission (y-axis) versus acceptability of the samples (x-axis). In particular, the percent transmission is shown for Li-based glass ceramic articles including a parting agent layer. As shown in FIG. 18, a coating that is too thick (e.g., greater than about 6 gsm) exhibits a percent transmission of less than 70%, while a coating that is too thin (e.g., less than about 2 gsm) exhibits a percent transmission of about 85%, but the glass sticks to adjacent glass sheets. However, samples that were otherwise acceptable exhibited a percent transmission of from about 76% to about 83% as measured in accordance with ASTM D1003.

Figure 19:
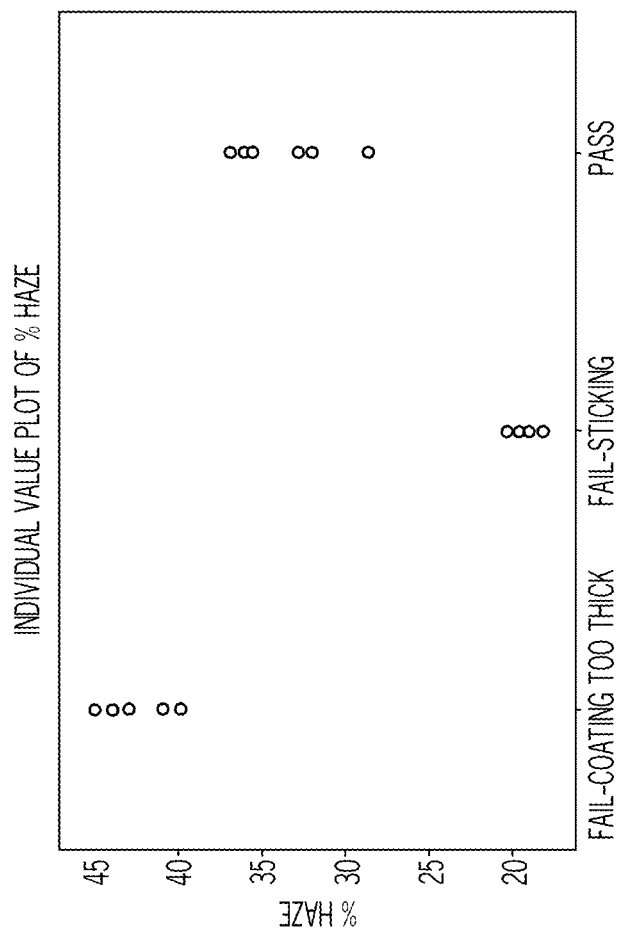
FIG. 19 is a graph of the % haze (y-axis) for various glass stacks in accordance with one or more embodiments described herein.

FIG. 19 is a plot of the percent haze (y-axis) versus the acceptability of the samples (x-axis). For samples having a coating that was too thick (e.g., greater than about 6 gsm), the percent haze was greater than about 40%, while samples that had coatings that were too thin (e.g., less than about 2 gsm), the percent haze was less than about 25% and the samples exhibited sticking. However, samples that were otherwise acceptable exhibited a percent haze of from about 25% to about 38% as measured in accordance with ASTM D1044.

In various embodiments, glass ceramic articles including the parting agent layer 110 exhibit less warp than glass ceramic articles formed without the parting agent layer 110. In other words, in addition to reducing the sticking between a glass sheet 108 and an adjacent glass sheet 108 and/or the setter plate 104, the parting agent layer 110 can reduce warp in the final glass ceramic article. Without being bound by theory, it is believed that application of a parting agent layer 110 as described herein can prevent localized sticking which contributes to warp in the glass ceramic article. In particular, during the ceramming process, the glass experiences shrinkage during phase change and crystal growth and the presence of the parting agent layer 110 allows the glass to move freely without constraint in the glass stack 106.

Figure 20:
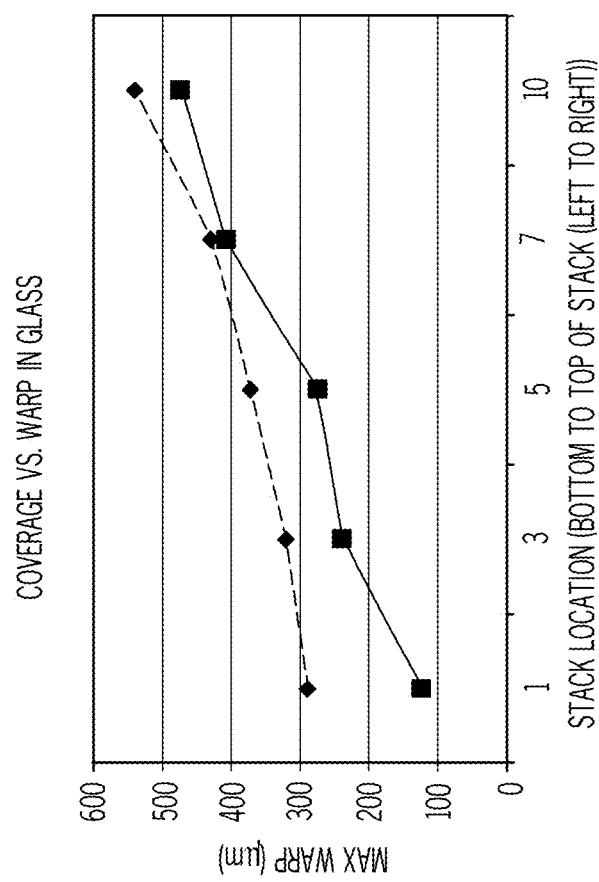
FIG. 20 is a graph plotting the maximum warp (μm; y-axis) as a function of stack location (bottom of stack to top of stack from left to right; x-axis) for application of a parting agent coating using varying spray head spacings in accordance with one or more embodiments described herein.

FIG. 20 is a graph of the maximum warp (in μm; y-axis) as a function of glass stack location (x-axis). The coating was applied with a 1.5" spray head spacing (solid line) and a 3.0" spray head spacing (dotted line). FIG. 20 shows that maximum warp increases from the bottom of the glass stack (left) to the top of the glass stack (right). Additionally, in embodiments in which the coating was applied with slight variances in the thickness and uniformity of the coating layer (3.0" spray head spacing), the max warp increases over the entire thickness of the glass stack as compared to a uniform application of the coating layer at dry coat weight of about 2 gsm with a 1.5" spray head spacing. Thus, demonstrated by the data presented in FIG. 20, sticking causes lower yields and physical degradation of the glass ceramic article and localized stiction constrains the glass, which increases warp in the final product.

In addition to decreasing the warp of the glass ceramic article, the parting agent layer 110 of various embodiments described herein has been found to leave the phase assemblage of the glass ceramic article unchanged. FIG. 9 is an XRD of the glass ceramic article including the parting agent layer 110 as cerammed (C) and post polishing (D). The surface layer effect is measured to be less than about 1 μm.

Thus, in various embodiments, the parting agent layer 110 can reduce CTE mismatch between the glass sheets 108 and the setter plate 104, reduce scuffing, and extend the life of the setter plates 104 by reducing wear. For example, it is believed that the CTE mismatch between the glass sheets 108 and the setter plate 104 can lead to scuffing if the glass sheets 108 stick to the setter plate 104. However, various embodiments of the parting agent composition, and particularly the colloidal binder, do not fully decompose during the thermal process. Accordingly, parting agent composition can be used to coat the setter plate 104 for multiple uses (e.g., greater than about 25 cycles) before the setter plate 104 needs to be re-coated. Therefore, in various embodiments, the parting agent layer 110, when applied in as an ultra-thin and uniform layer, prevents sticking in high temperature glass-glass stacking configurations, which can, in turn, reduce warp of a final glass ceramic article.

Glass Stack Configuration

In various embodiments described herein, multiple glass sheets 108 are arranged in a glass stack 106 for the ceramming process. In addition to the variables described above as impacting the warp and stress of the final glass ceramic article, it was further discovered that various elements of the glass stacking configuration have an impact on the warp and stress of the glass ceramic article.

Figure 21:
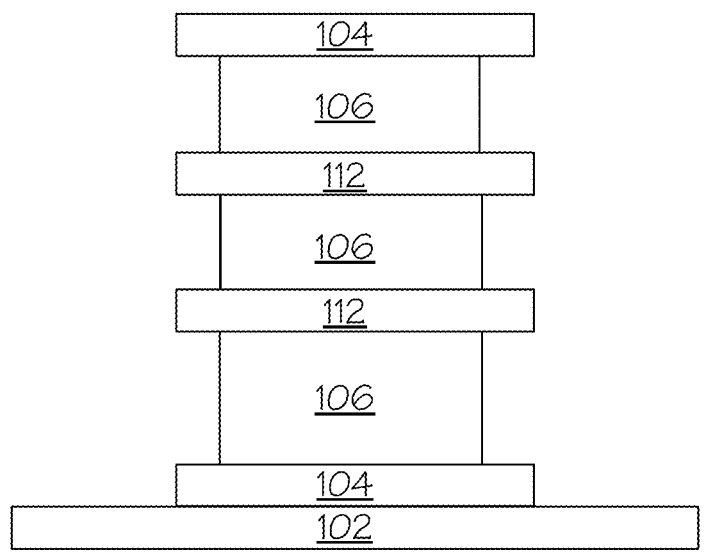
FIG. 21 is a schematic illustration of a glass stack configuration including interlayer setter plates in accordance with one or more embodiments described herein.
Figure 22:
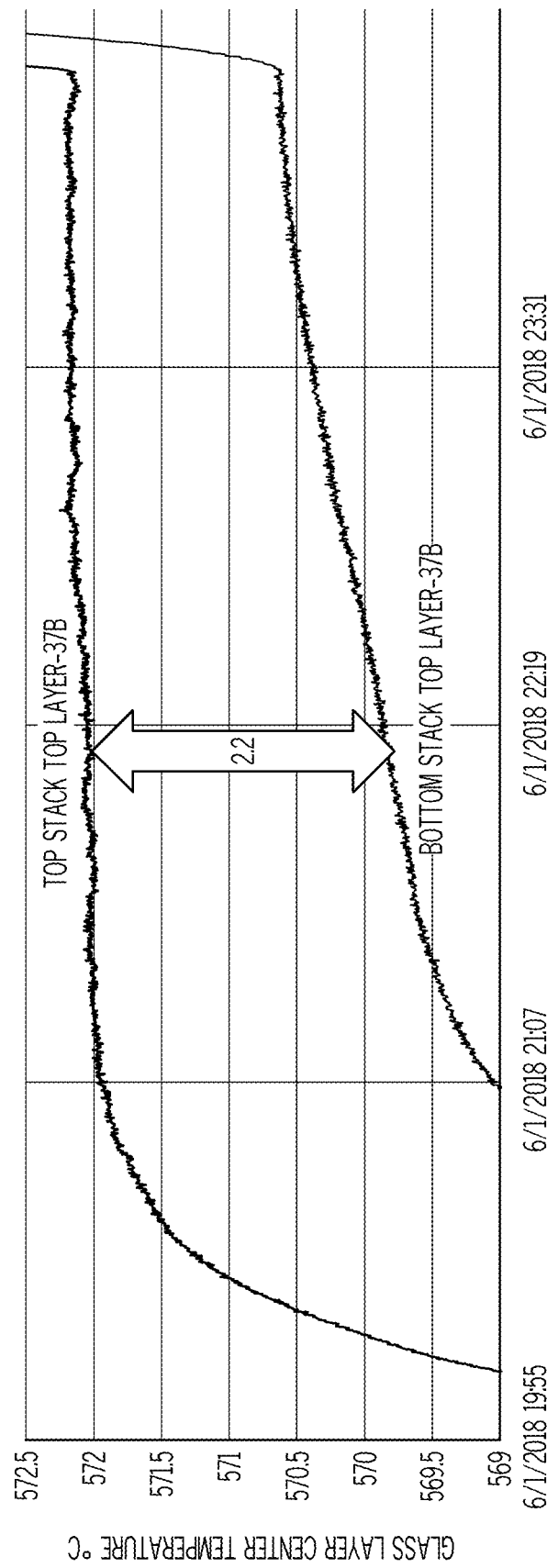
FIG. 22 is a graph plotting the glass layer center temperature (° C.; y-axis) as a function of time (x-axis) for the top sheet of glass in a glass stack and the bottom sheet of glass in the glass stack in accordance with one or more embodiments described herein.
Figure 23:
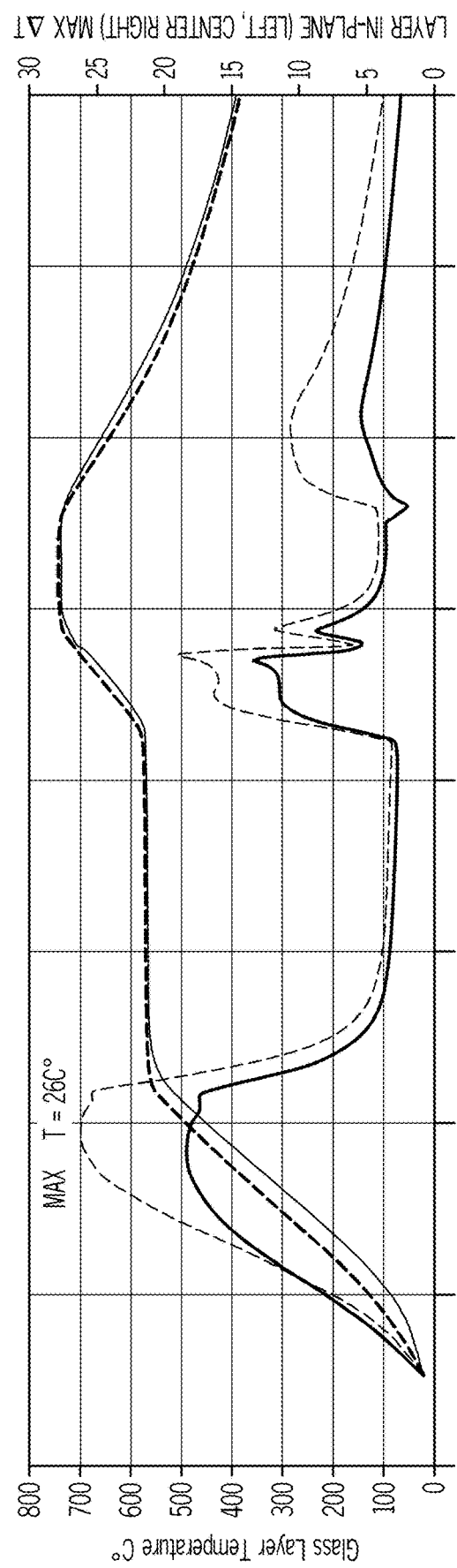
FIG. 23 is a graph plotting the glass layer temperature (° C.; y-axis) as a function of time (x-axis) during a ceramming process for the top sheet of glass in a glass stack and the bottom sheet of glass in the glass stack in accordance with one or more embodiments described herein.

Accordingly, in various embodiments, interlayer setter plates 112 may be placed within the glass stack 106, as shown in FIG. 21. The inclusion of the interlayer setter plates 112 can increase heat transfer and decrease the temperature lag from the top of the glass stack to the bottom of the glass stack. As shown in FIG. 22, when the temperature of each glass sheet in the stack including three interlayer setter plates is measured during the nucleation stage of the ceramming process, there is a 2.2° C. variability between the top layer of the top stack and the bottom layer of the bottom stack. Moreover, as shown in FIG. 23, although there remains a temperature differential during the ramping periods of the ceramming process, the inclusion of interlayer setter plates in the glass stack achieves temperature uniformity throughout the glass stack during the soaking periods.

Figure 24:
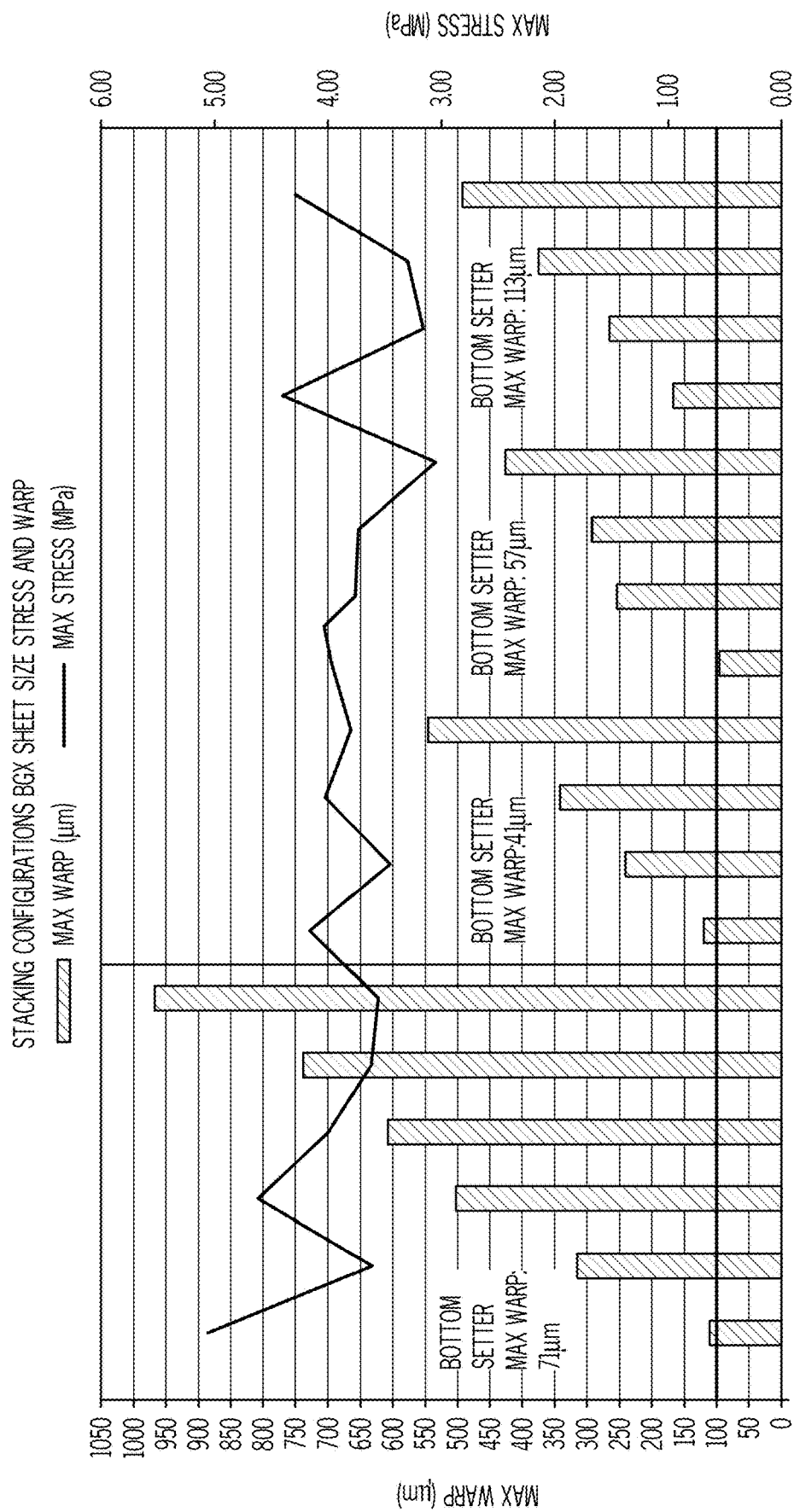
FIG. 24 is a graph illustrating the maximum warp (μm; left y-axis) as bars through the thickness of the glass stack for various amounts of applied force and the maximum stress (MPa; right y-axis) as a line graph for glass stacks without interlayer setter plates (left) and including interlayer setter plates (right) in accordance with one or more embodiments described herein.

Additionally, the inclusion of interlayer setter plates 112 reduces the warp and does not significantly impact the stress in the glass ceramic article, as shown in FIG. 24. Specifically, FIG. 24 shows that the inclusion of the interlayer setter plates 112 (right side of the graph) can reset the additive warp at each interlayer setter plate as compared to the increasing warp of the glass stack without interlayer setter plates (left side of the graph). The maximum stress is shown in FIG. 24 as the line graph, which does not increase with the addition of the interlayer setter plates.

In addition to including interlayer setter plates 112 within the glass stack 106, warp and stress in the glass ceramic article may further be controlled or reduced by limiting the number of glass sheets incorporated in the glass stack. For example, in some embodiments, the glass stack can be from 6 to 24 glass sheets, or from 10 to 20 glass sheets from setter plate 104 to setter plate 104. In embodiments in which interlayer setter plates are disposed within the glass stack, the number of glass sheets between each interlayer setter plate may be from 5 glass sheets to 15 glass sheets, or from 6 glass sheets to 10 glass sheets.

Accordingly, various embodiments described herein may be employed to produce glass ceramic articles having excellent optical quality and reduced warp while not adversely impacting, or even improving, stress in the glass ceramic articles as compared to glass articles cerammed according to conventional techniques. Such glass ceramic articles may be particularly well-suited for use in portable electronic devices due to their strength performance and high transmission values.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents. For example, the features may be combined according to the following list of non-exhaustive embodiments.

Embodiment 1

A method of ceramming a plurality of glass sheets comprising:

positioning a first portion of the plurality of glass sheets in a first stack between a first setter plate and a second setter plate and a second portion of the plurality of glass sheets in a second stack between the second setter plate and a third setter plate on top of the first stack in a glass stack configuration; and exposing the glass stack configuration to a ceramming cycle to ceram the plurality of glass sheets, wherein a ΔT of the first stack or the second stack is less than 10° C. when the glass sheets are heated to a nucleation temperature for a predetermined period of time during the ceramming cycle; or wherein a ΔT of the first stack or the second stack is less than 10° C. when the glass sheets are heated to a crystallization temperature for a predetermined period of time during the ceramming cycle.

Embodiment 2

The method of claim 1, wherein the plurality of glass sheets have a maximum thickness variation of 21 μm or less.

Embodiment 3

The method of claim 1 or claim 2, further comprising removing the edge beads on each of the plurality of glass sheets.

Embodiment 4

The method of any preceding claim, further comprising forming a parting agent layer between one of the plurality of glass sheets and adjacent one of the plurality of glass sheets from an aqueous dispersion of boron nitride and a colloidal inorganic binding agent.

Embodiment 5

The method of any preceding claim, further comprising forming a parting agent layer between one of the plurality of glass sheets and adjacent one of first setter plate, the second setter plate, or the third setter plate from an aqueous dispersion of boron nitride and a colloidal inorganic binding agent.

Embodiment 6

The method of any preceding claim, wherein during the predetermined period of time at which the glass sheets are maintained at the nucleation temperature, the glass stack configuration has a ΔT of 2.2° C. or less between a bottom of the first stack proximate the first setter plate and a top of the second stack proximate the third setter plate.

Embodiment 7

The method of any preceding claim, wherein the ceramming process includes a controlled cooling from a maximum temperature in the ceramming process to a temperature of about 450° C. at a rate of about 4° C./min followed by a quenching step to a temperature of approximately room temperature.

Embodiment 8

The method of any preceding claim, wherein each of the first setter plate, the second setter plate, and the third setter plate comprise reaction bonded silicon carbide.

Embodiment 9

The method of any preceding claim, wherein each of the first setter plate, the second setter plate, and the third setter plate have a maximum flatness of less than or equal to about 100 μm.

Embodiment 10

The method of any preceding claim, wherein each of the first setter plate, the second setter plate, and the third setter plate have a maximum flatness of less than or equal to about 25 μm.

Embodiment 11

The method of any preceding claim, wherein each of the first setter plate, the second setter plate, and the third setter plate has a thickness t of from about 6.5 mm to about 10 mm.

Embodiment 12

The method of any preceding claim, wherein the glass stack configuration is supported on a carrier plate comprising steel in an open grid configuration.

Embodiment 13

A method of ceramming a plurality of glass sheets comprising:
reducing a thickness variation in the plurality of glass sheets;
positioning the plurality of glass sheets between a first setter plate and a second setter plate in a glass stack configuration; and
exposing the glass stack configuration to a ceramming cycle to ceram the plurality of glass sheets.

Embodiment 14

The method of claim 13, wherein reducing the thickness variation in the plurality of glass sheets comprises reducing the thickness variation in the plurality of glass sheets to a maximum thickness variation of 21 μm or less.

Embodiment 15

The method of embodiment 13 or embodiment 14, further comprising removing the edge beads on each of the plurality of glass sheets.

Embodiment 16

The method of any of embodiments 13-15, further comprising forming a parting agent layer between one of the plurality of glass sheets and adjacent one of the plurality of glass sheets from an aqueous dispersion of boron nitride and a colloidal inorganic binding agent.

Embodiment 17

The method of any of embodiments 13-16, wherein during the predetermined period of time at which the glass sheets are maintained at a nucleation temperature, the glass stack configuration has a ΔT of 2.2° C. or less between a glass sheet proximate the first setter plate and a glass sheet proximate the second setter plate.

Embodiment 18

The method of any of embodiments 13-17, wherein the ceramming process includes a controlled cooling from a maximum temperature in the ceramming process to a temperature of about 450° C. at a rate of about 4° C./min followed by a quenching step to a temperature of approximately room temperature.

Embodiment 19

The method of any of embodiments 13-18, wherein each of the first setter plate and the second setter plate has a maximum flatness of less than or equal to about 25 µm.

Embodiment 20

The method of any of embodiments 13-19, wherein the glass stack configuration is supported on a carrier plate comprising steel in an open grid configuration.

What is claimed is:

1. A method of ceramming a plurality of glass sheets comprising:
    positioning a first portion of the plurality of glass sheets in a first stack between a first setter plate and a second setter plate and a second portion of the plurality of glass sheets in a second stack between the second setter plate and a third setter plate on top of the first stack in a glass stack configuration;
    forming a parting agent layer between and adjacent to one of the plurality of glass sheets and an adjacent one of the plurality of glass sheets from an aqueous dispersion of boron nitride and a colloidal inorganic binding agent; and
    exposing the glass stack configuration to a ceramming cycle to ceram the plurality of glass sheets of the glass stack configuration,
    wherein a ΔT of the first stack or the second stack is less than 10° C. when the glass sheets are heated to a nucleation temperature for a predetermined period of time during the ceramming cycle; or
    wherein a ΔT of the first stack or the second stack is less than 10° C. when the glass sheets are heated to a crystallization temperature for a predetermined period of time during the ceramming cycle.

2. The method of claim 1, wherein the plurality of glass sheets of the glass stack configuration have a maximum thickness variation of 21 µm or less.

3. The method of claim 1, wherein during the predetermined period of time at which the glass sheets are maintained at the nucleation temperature, the glass stack configuration has a ΔT of 2.2° C. or less between a bottom of the first stack proximate the first setter plate and a top of the second stack proximate the third setter plate.

4. The method of claim 1, wherein the ceramming process includes a controlled cooling from a maximum temperature in the ceramming process to a temperature of about 450° C. at a rate of 4° C./min followed by a quenching step to a temperature of approximately room temperature.

5. The method of claim 1, wherein each of the first setter plate, the second setter plate, and the third setter plate comprise reaction bonded silicon carbide.

6. The method of claim 1, wherein each of the first setter plate, the second setter plate, and the third setter plate have a maximum flatness of less than or equal to about 100 µm.

7. The method of claim 1, wherein each of the first setter plate, the second setter plate, and the third setter plate has a thickness t of from about 6.5 mm to about 10 mm.

8. The method of claim 1, wherein the glass stack configuration is supported on a carrier plate comprising steel in an open grid configuration.

9. A method of ceramming a plurality of glass sheets comprising:
    reducing a thickness variation in the plurality of glass sheets;
    positioning the plurality of glass sheets between a first setter plate and a second setter plate in a glass stack configuration;
    forming a parting agent layer between and adjacent to one of the plurality of glass sheets and an adjacent one of the plurality of glass sheets from an aqueous dispersion of boron nitride and a colloidal inorganic binding agent; and
    exposing the glass stack configuration to a ceramming cycle to ceram the plurality of glass sheets.

10. The method of claim 9, wherein reducing the thickness variation in the plurality of glass sheets comprises reducing the thickness variation in the plurality of glass sheets to a maximum thickness variation of 21 µm or less.

11. The method of claim 9, wherein during the predetermined period of time at which the glass sheets are maintained at a nucleation temperature, the glass stack configuration has a ΔT of 2.2° C. or less between a glass sheet proximate the first setter plate and a glass sheet proximate the second setter plate.

12. The method of claim 9, wherein the ceramming process includes a controlled cooling from a maximum temperature in the ceramming process to a temperature of about 450° C. at a rate of 4° C./min followed by a quenching step to a temperature of approximately room temperature.

13. The method of claim 9, wherein each of the first setter plate and the second setter plate has a maximum flatness of less than or equal to about 25 µm.

* * * * *